United States Patent
Yagi

(10) Patent No.: US 11,954,992 B2
(45) Date of Patent: Apr. 9, 2024

(54) MONITORING SYSTEM, MONITORING METHOD, AND PROGRAM

(71) Applicant: Bsize Inc., Yokohama (JP)

(72) Inventor: Keita Yagi, Yokohama (JP)

(73) Assignee: BSIZE INC., Yokohama (JP)

( * ) Notice: Subject to any disclaimer, the term of this patent is extended or adjusted under 35 U.S.C. 154(b) by 161 days.

(21) Appl. No.: 17/486,263

(22) Filed: Sep. 27, 2021

(65) Prior Publication Data
US 2022/0012997 A1 Jan. 13, 2022

Related U.S. Application Data

(63) Continuation of application No. PCT/JP2019/014550, filed on Apr. 1, 2019.

(51) Int. Cl.
G08B 21/02 (2006.01)
H04W 4/02 (2018.01)
H04W 4/021 (2018.01)

(52) U.S. Cl.
CPC ..... *G08B 21/0294* (2013.01); *G08B 21/0233* (2013.01); *H04W 4/021* (2013.01); *H04W 4/027* (2013.01)

(58) Field of Classification Search
CPC .......... G08B 21/02; G08B 21/0233; G08B 21/0294; H04W 4/021; H04W 4/027; H04W 4/029; H04W 4/80; G16H 40/67
See application file for complete search history.

(56) References Cited

U.S. PATENT DOCUMENTS

| 2008/0068157 A1* | 3/2008 | Ikemori | G08B 21/0238 340/539.23 |
| 2015/0180746 A1 | 6/2015 | Day, II et al. | |
| 2016/0278706 A1* | 9/2016 | Okamoto | A61B 5/6889 |

(Continued)

FOREIGN PATENT DOCUMENTS

| CN | 101754435 | 6/2010 |
| CN | 102291674 | 12/2011 |

(Continued)

OTHER PUBLICATIONS

Office Action received in JP Application No. 201980095133.2, dated Mar. 15, 2023.

(Continued)

*Primary Examiner* — Orlando Bousono
(74) *Attorney, Agent, or Firm* — Knobbe, Martens, Olson & Bear, LLP

(57) ABSTRACT

A monitoring system (10) including: an information accumulation program (32) configured to accumulate position information of a user terminal (100) carried by a watched person, the position information being determined based on information uploaded from the user terminal; a living area determination program (33) configured to determine a living area of the watched person, based on position information accumulated in a predetermined period among pieces of the accumulated position information; a determination program (37) configured to determine a positional relationship between a position of the user terminal, which is determined based on the position information of the first terminal, and the living area; and a notification program (28) configured to notify a guardian terminal (209) of a determination result.

15 Claims, 19 Drawing Sheets

(56) References Cited

U.S. PATENT DOCUMENTS

| | | | | |
|---|---|---|---|---|
| 2018/0122207 A1* | 5/2018 | Noda | .................... | A61B 5/743 |
| 2018/0137735 A1* | 5/2018 | Matsuoka | ............. | A61B 5/1112 |
| 2019/0208363 A1* | 7/2019 | Shapiro | .................. | G16H 40/63 |
| 2019/0213860 A1* | 7/2019 | Shaprio | ................ | H04W 4/029 |
| 2020/0034376 A1* | 1/2020 | Miyahara | ............. | G06Q 50/265 |

FOREIGN PATENT DOCUMENTS

| | | |
|---|---|---|
| CN | 108650630 | 10/2018 |
| JP | 2002-269653 A | 9/2002 |
| JP | 2009/053171 A | 3/2009 |
| JP | 2012-221267 A | 11/2012 |
| JP | 2013-105457 A | 5/2013 |
| JP | 2014-179890 A | 9/2014 |
| JP | 2017045252 A | 3/2017 |
| JP | 2018-195981 A | 12/2018 |
| WO | WO 2018/133290 A1 | 7/2018 |

OTHER PUBLICATIONS

Chinese Office Action in CN 201980095133.2; dated Jul. 19, 2022.
English Translation of International Preliminary Report on Patentability and Written Opinion in International Application No. PCT/JP2019/014550, dated Oct. 14, 2021 in 8 pages.
Extended European Search Report received in Application No. 19922947.7, dated Oct. 11, 2022.
Takahashi, Akiko, "Thorough Comparison of Mobile Phones and GPS for Children! What would be the best device to protect them while they walk to/from school and cram school," Impress Corporation, Dekiru Net, http://dekiru.net/article/15964, Oct. 24, 2017.
International Search Report for PCT/JP2019/014550, dated Jun. 11, 2019 in 3 pages.
Office Action received in Japanese Application No. 2021-511815, dated Apr. 25, 2023.
Office Action received in Chinese Application No. 201980095133.2, dated Mar. 15, 2023.
Office Action received in Japanese Application No. 2023-184289, dated Nov. 28, 2023.

* cited by examiner

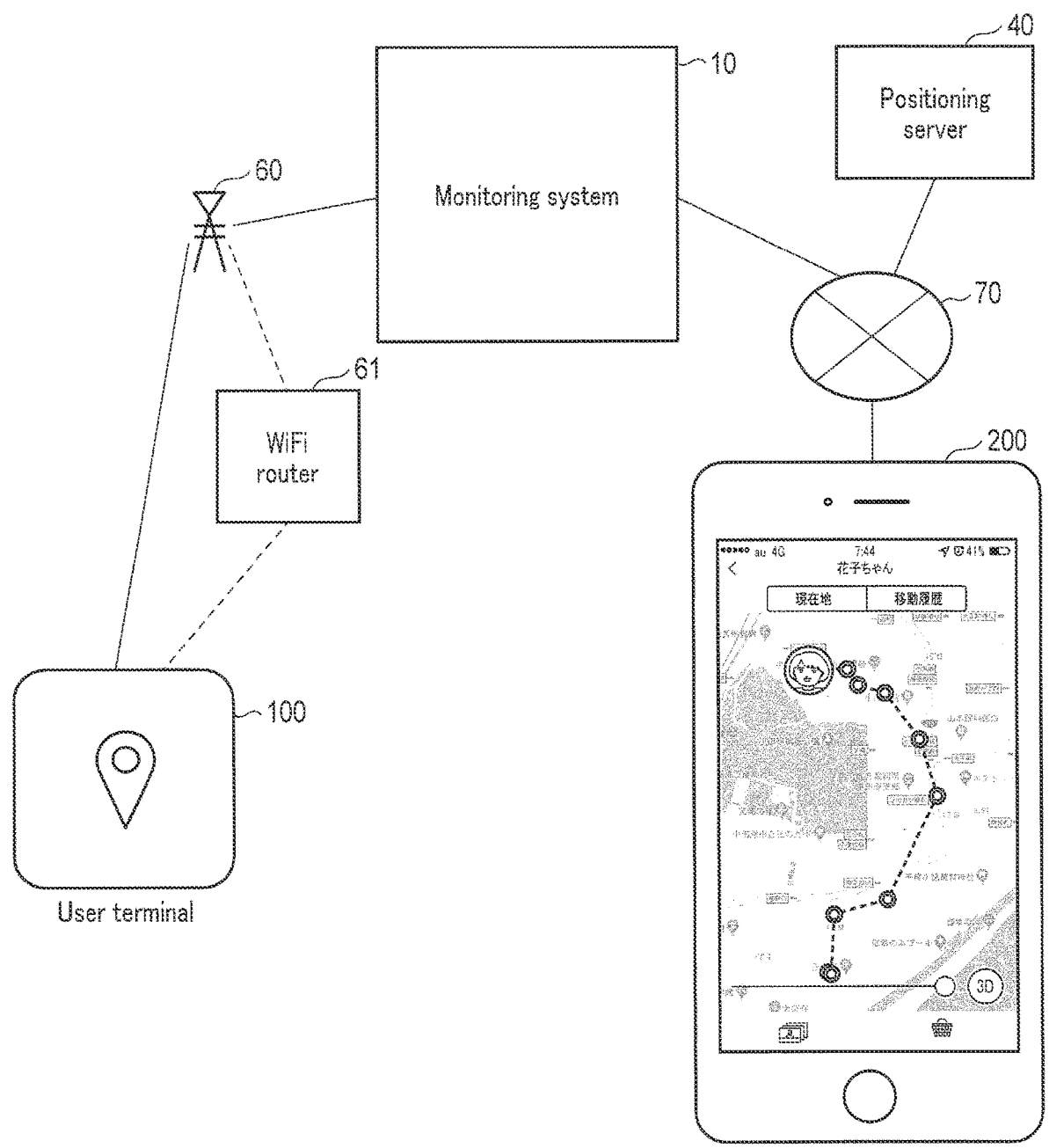
F I G. 1

| Identification number | Guardian address | Living area position information | . . . . |
|---|---|---|---|
| 2018001 | ja8ycc@email.com | N0374803E··· | |
| 2018002 | | | |
| 2018003 | | | | a — Identification number
b — Guardian address
h — Living area position information
22: User registration DB

FIG. 4

24: Upload information DB

| Time stamp | Identification number | GPS position information | WiFi position information | Base station position information | Battery residual capacity information | ... |
|---|---|---|---|---|---|---|
| 20181001220345 | 2018012 | N374352E1354322 | N374352E1354323 | N374352E1354326 | 60% | ... |
| ...... | ...... | ...... | ...... | ...... | ...... | ...... | c  a  d  e  f  g

F I G. 5

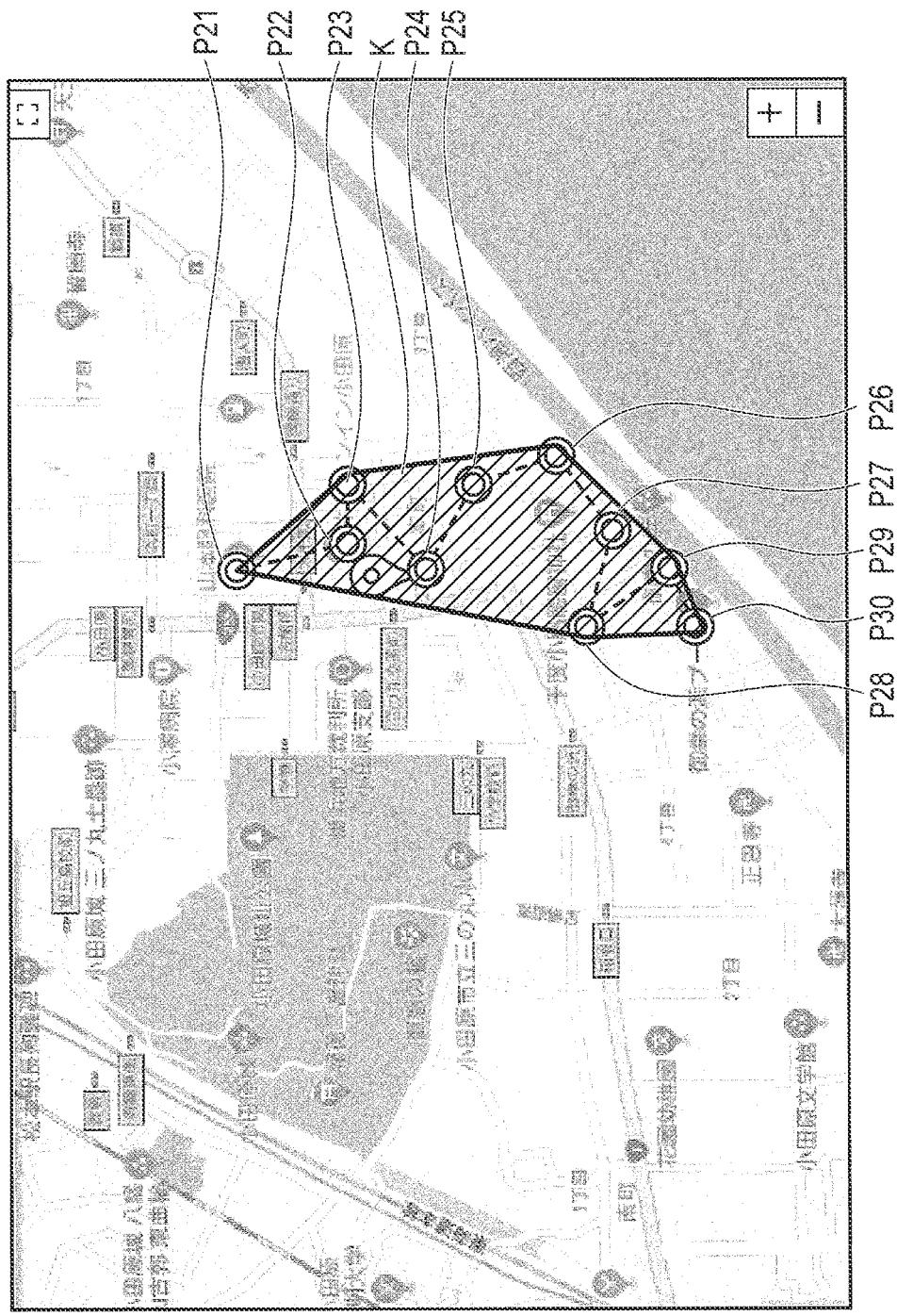
F I G. 8

FIG. 13

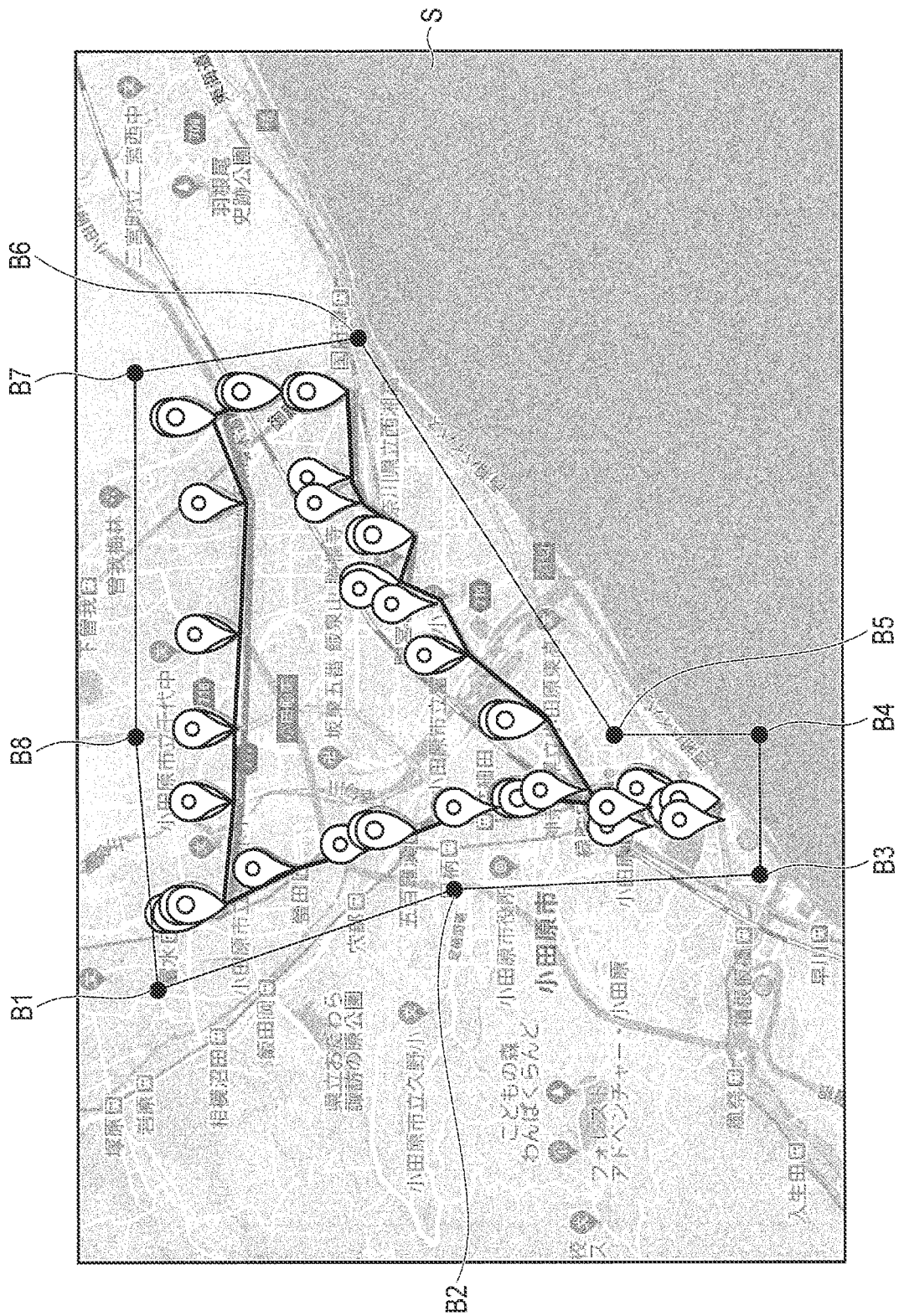
F I G. 16

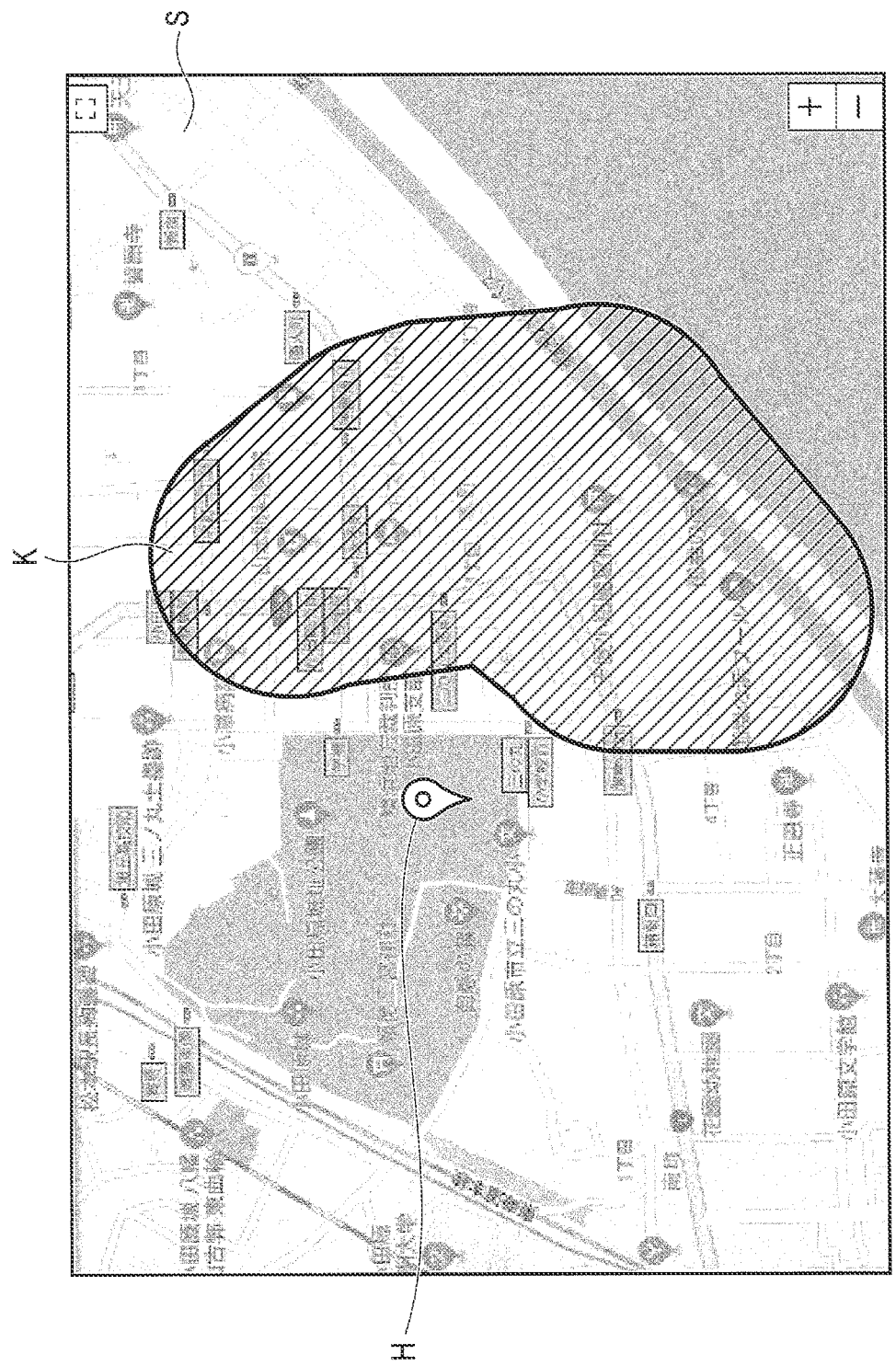
F I G. 17

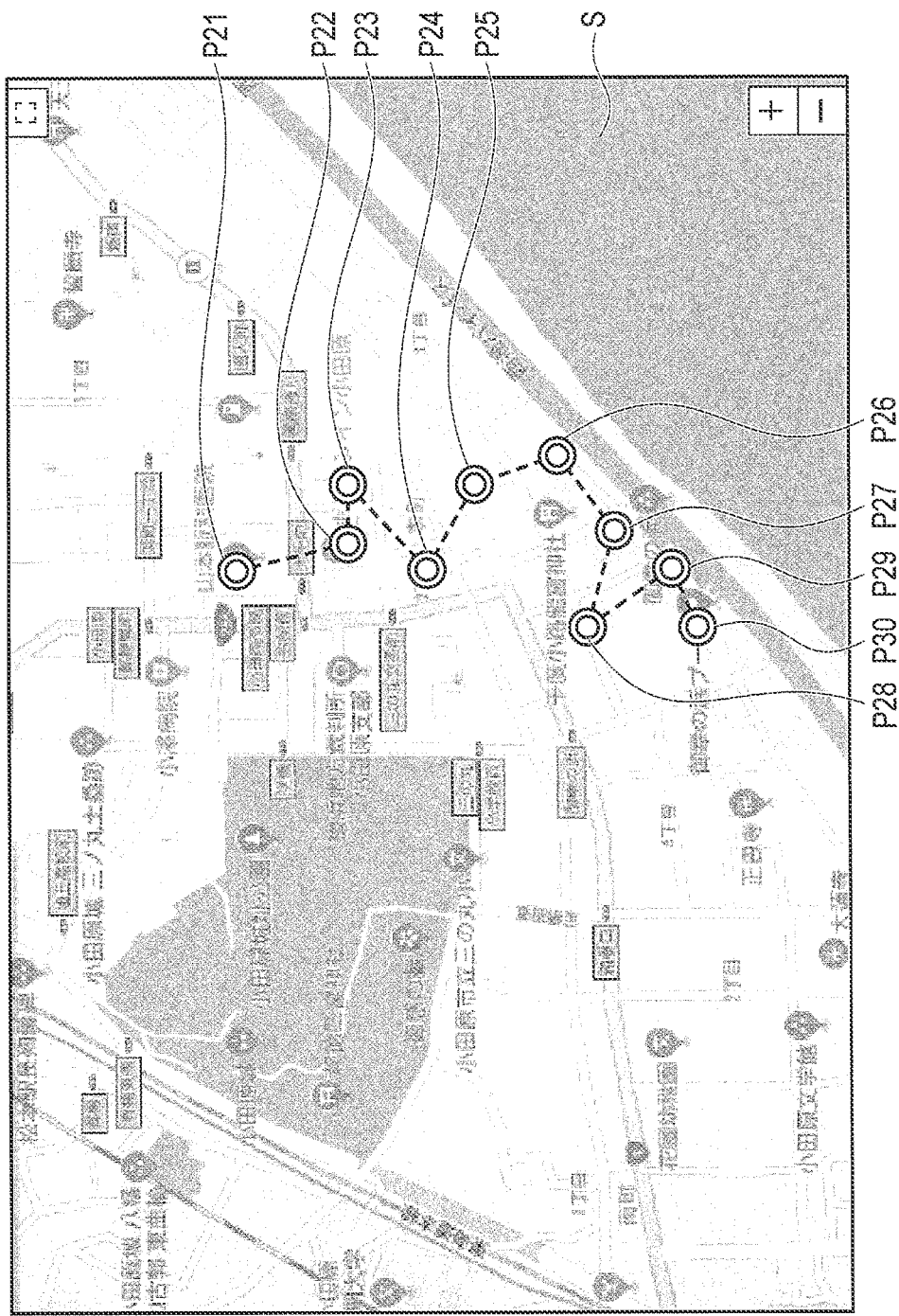
F I G. 18

MONITORING SYSTEM, MONITORING METHOD, AND PROGRAM

CROSS-REFERENCE TO RELATED APPLICATION

This application is a Continuation Application of PCT Application No. PCT/JP2019/014550, filed Apr. 1, 2019, the entire contents of which are incorporated herein by reference.

FIELD

The present invention relates to a monitoring system with a watching function suitable for, for example, watching over a child or a wandering elderly person, a monitoring method, and a program.

BACKGROUND

When a child has become an elementary school student and has often acted alone, the prime concern of the guardian is to secure the safety of the child. Also for the family, a nursing care facility or the like of an elderly person with a habit of wandering about, the prime concern is to secure the safety of the elderly person.

Under the circumstance, a monitoring system has been put to practical use, which enables a guardian, a family member or staff of a nursing care facility or the like to grasp in real time the present position of a watched target (also referred to as "watched person") such as a child or a wandering elderly person (see, for example, https://dekiru.net/article/15964 (Oct. 24, 2017)).

SUMMARY

By using this kind of monitoring system, a watching person can not only grasp in real time the present position of a watched person, but also can understand the history of movement by tracing the place of presence of the watched person in a time-series manner.

Thereby, for example, the guardian can understand that the child is within a usual area of activity, i.e. within a living area, such as a fact that the child is moving along a correct school route or that the child is playing in a usual park, or, conversely, the guardian can understand that the child is out of the usual area of activity, i.e. out of the living area.

However, it is not always possible for the watching person to constantly watch the present position of the watched person. Thus, even when the watched person is out of the living area, it is not always possible for the watching person to immediately grasp this fact, and there is concern that the watching person notices the fact after the passing of a considerable length of time. In another case, even when the watching person is constantly watch the place of presence of the watched person, if the watching person does not comprehend the living area of the watched person, there is concern that the watching person does not notice that the watched person is out of the living area.

The present invention has been made in consideration of the above circumstance, and the object of the invention is to provide a monitoring system which can determine a living area for a watched person, and can notify a watching person of a positional relationship between the watched person and the living area, a monitoring method, and a program.

In order to achieve the above object, the present invention takes the following means.

The monitoring system according to the first embodiment of the present invention includes: an information accumulation unit configured to accumulate position information of a first terminal carried by a watched person, the position information being determined based on information uploaded from the first terminal; a living area determination unit configured to determine a living area of the watched person, based on position information accumulated in a predetermined period among pieces of the accumulated position information; a determination unit configured to determine a positional relationship between a position of the first terminal, which is determined based on the position information of the first terminal, and the living area; and a notification unit configured to notify a second terminal, which is designated in advance, of a determination result by the determination unit.

The monitoring system according to the second embodiment of the present invention is the first embodiment, wherein the living area determination unit is configured to determine the living area, based on, among a plurality of sections into which a map is divided, a section to which the position information accumulated in the predetermined period belongs a predetermined number of times or more.

The monitoring system according to the third embodiment of the present invention is the first embodiment, wherein the living area determination unit is configured to determine, as the living area, an area including positions corresponding to the position information accumulated in the predetermined period.

The monitoring system according to the fourth embodiment of the present invention is the third embodiment, wherein a shape of the area is a projection shape, a circular shape or a rectangular shape.

The monitoring system according to the fifth embodiment of the present invention is the second embodiment, wherein the living area determination unit is configured to enlarge or reduce the determined living area, based on a predetermined standard.

The monitoring system according to the sixth embodiment of the present invention is the second embodiment, wherein the predetermined period is past 30 days, and the predetermined number of times is two.

The monitoring system according to the seventh embodiment of the present invention is the first embodiment, wherein, when determining the living area, the living area determination unit determines the living area, based on position information accumulated under a predetermined condition among pieces of the position information accumulated in the predetermined period.

The monitoring system according to the eighth embodiment of the present invention is the seventh embodiment, wherein the position information accumulated under the predetermined condition is any one of position information accumulated in a weekday, position information accumulated in a weekend/holiday, and position information accumulated in a specific day of a week.

The monitoring system according to the ninth embodiment of the present invention is the seventh or eighth embodiment, wherein the position information accumulated under the predetermined condition is position information accumulated in a specific time zone.

The monitoring system according to the tenth embodiment of the present invention is the first embodiment further includes: a map information creation unit configured to create map information in which the living area is specified on a map; and a transmission unit configured to transmit the created map information to the second terminal.

The monitoring system according to the eleventh embodiment of the present invention is the first embodiment further includes: a living area correction unit configured to correct the determined living area in accordance with an instruction from the second terminal.

The monitoring system according to the twelfth embodiment of the present invention is the first embodiment, wherein when the determination unit determines that the position of the first terminal is out of the living area, the notification unit is configured to notify a result of the determination.

The monitoring system according to the thirteenth embodiment of the present invention includes: a reception unit configured to receive information which defines a living area of a watched person; an information accumulation unit configured to accumulate position information of a first terminal carried by the watched person, the position information being determined based on information uploaded from the first terminal; a determination unit configured to determine a positional relationship between a position of the first terminal, which is determined based on the position information of the first terminal, and the living area; and a notification unit configured to notify a second terminal, which is designated in advance, of a determination result by the determination unit.

The monitoring method according to the fourteenth embodiment of the present invention is a monitoring method executed by a processor, includes: a step of accumulating, by the processor, position information of a first terminal carried by a watched person in a storage device, the position information being determined based on information uploaded from the first terminal; a step of determining, by the processor, a living area of the watched person, based on position information accumulated in a predetermined period among pieces of the position information accumulated in the storage device; a step of determining, by the processor, a positional relationship between a position of the first terminal, which is determined based on the position information of the first terminal, and the living area; and a step of notifying, by the processor, a second terminal, which is designated in advance, of a result of the determining of the positional relationship.

The program according to the fifteenth embodiment of the present invention is a program for causing a processor to implement: a function of accumulating position information of a first terminal carried by a watched person in a storage device, the position information being determined based on information uploaded from the first terminal; a function of determining a living area of the watched person, based on position information accumulated in a predetermined period among pieces of the position information accumulated in the storage device; a function of determining a positional relationship between a position of the first terminal, which is determined based on the position information of the first terminal, and the living area; and a function of notifying a second terminal, which is designated in advance, of a result of the determining of the positional relationship.

According to the monitoring system, monitoring method and program of the present invention, by taking the above means, the living area for a watched person can be determined. Furthermore, when the watched person moves out of the living area, this fact can be detected and notified to a watching person.

BRIEF DESCRIPTION OF THE DRAWINGS

FIG. 1 is a conceptual view for describing a concept of a monitoring system to which a monitoring method according to an embodiment of the present invention is applied.

FIG. 4 is a data structure diagram illustrating an example of a user registration DB.

FIG. 5 is a data structure diagram illustrating an example of an upload information DB.

FIG. 8 is a view for describing an example of a second determination method of the living area.

FIG. 13 is a schematic view illustrating an example of a setting screen.

FIG. 16 illustrates map information for describing a setting method of a living area by a living area correction program.

FIG. 17 is a conceptual view illustrating an example of map information displaying a positional relationship between a living area and a present position of the user terminal.

FIG. 18 is a schematic view illustrating an example of map information on which a movement history of the user terminal is displayed.

DETAILED DESCRIPTION

FIG. 1 is a conceptual view for describing a concept of a monitoring system to which a monitoring method according to an embodiment of the present invention is applied.

Based on information uploaded from a terminal 100 (hereinafter referred to as "user terminal 100") carried by a watched person (e.g. a target to be watched, such as a child or an elderly person), a monitoring system 10 comprehends the position of the user terminal 100. Based on a history of the position of the user terminal 100, the monitoring system 10 determines a living area of the watched person, and notifies a terminal 200 (hereinafter referred to as "guardian terminal 200") of a watching person (e.g. a guardian or a supervisor of the watched person; hereinafter, also referred to as "guardian") of a positional relationship between the present position of the user terminal 100.

Figure 2:
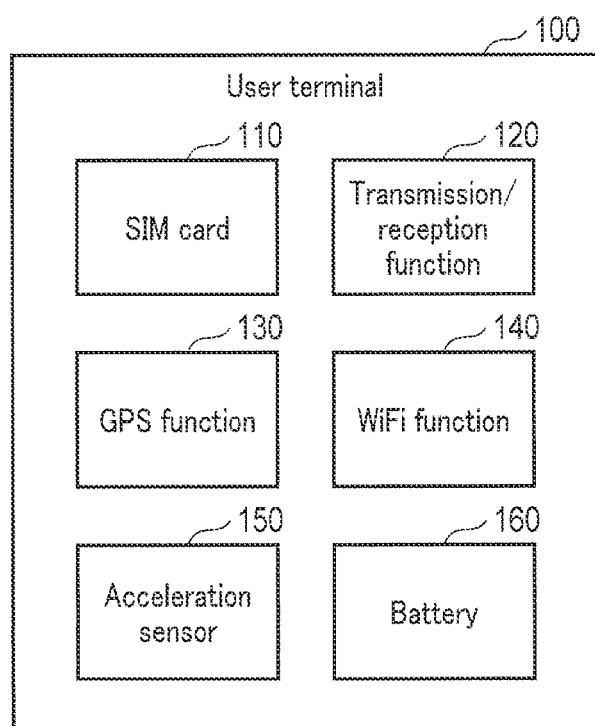
FIG. 2 is a schematic view illustrating a functional configuration example of a user terminal.

FIG. 2 is a schematic view illustrating a functional configuration example of the user terminal.

The user terminal 100 includes a SIM card 110; a transmission/reception function 120 which is communicable with the monitoring system 10 via a base station 60 by a cellular method such as 3G, LTE (trademark), 4G or 5G; a GPS function 130 which acquires GPS information; a Wifi function 140 which acquires a MAC address of a nearby WiFi router, together with information indicative of a received signal strength indicator (RSSI) Of a radio wave received from the WiFi router; an acceleration sensor 150 which measures an acceleration of the user terminal 100; and a battery 160, such as a lithium ion battery, which supplies electric power to the user terminal 100 and is rechargeable. Since these components are all composed by applying well-known art, a further detailed description thereof is omitted here.

In addition, the user terminal 100 may directly communicate with the base station 60 by the transmission/reception function 120, and may also indirectly communicate with the base station 60 via a WiFi router 61, as indicated by a broken line in FIG. 1. In this case, the WiFi router 61 can be implemented by, for example, a smartphone.

Besides, the user terminal 100 may communicate with the monitoring system 10 by using a communication method other than the cellular method, such as LPWA (Low Power Wide Area). In this case, in the user terminal 100, the SIM card 110 is not necessary. Furthermore, the base station 60 is replaced with a gateway. In this manner, depending on the communication method, reference sign 60 denotes a base station or a gateway. In the description below, by way of example, a mode will be described in which the user terminal 100 communicates with the monitoring system 10 by the cellular method, i.e., via the base station 60.

The user terminal 100 is formed light and small in size such that the user terminal 100 does not become cumbersome even when a child or an elderly person carries the user terminal 100, and a unique identification number is preset to each user terminal 100.

In order to start the use of the monitoring system 10, it is first necessary to execute user registration of the user terminal 100 in the monitoring system 10. The user registration is executed by transmitting an identification number a of the user terminal 100 to the monitoring system 10 from the guardian terminal 200 that is, for example, a smartphone or a PC, via a communication network 70 such as the Internet.

Responding to this, the monitoring system 10 recognizes the user terminal 100 with the identification number a as being the user terminal 100 of the monitoring target (the target to be watched), and recognizes a mail address, which the guardian terminal 200 used in order to transmit the identification number a, as being an address b (hereinafter, also referred to as "guardian address b") of the guardian terminal 200. In this manner, if the user terminal 100 and the guardian terminal 200 are recognized by the monitoring system 10, the user registration is completed.

After the user registration, the user terminal 100 awakes when the acceleration sensor 150 has detected an acceleration of a predetermined value or more, i.e. when the user terminal 100 has moved, and acquires GPS information by the GPS function 130 at intervals of, for example, 1.5 minutes which are set by default. Note that the GPS information includes not only position information but also a time stamp indicative of the time when the position is determined.

Further, the user terminal 100 uploads the acquired GPS information, together with the identification number a of the user terminal 100, to the monitoring system 10 by using the transmission/reception function 120. Note that, at this time, the transmission/reception function 120 can acquire battery residual capacity information from the battery 160, and can upload the battery residual capacity information, too, to the monitoring system 10.

In the meantime, there is a case where the user terminal 100 is positioned in a place where the GPS function 130 cannot acquire GPS information. In this case, the user terminal 100 acquires, by the WiFi function 140, MAC addresses of a plurality of nearby WiFi routers, together with received signal strength indicator information of radio waves from the WiFi routers. Note that the received signal strength indicator information includes time stamps indicative of times when the radio waves are transmitted from the WiFi routers.

Then, the user terminal 100 uploads, instead of the GPS information, the acquired MAC addresses of the WiFi routers and the received signal strength indicator information of radio waves from the WiFi routers, together with the identification information a of the user terminal 100, to the monitoring system 10 from the transmission/reception function 120. As will be described later, the MAC addresses of the WiFi routers and the received signal strength indicator information of radio waves from the WiFi routers are used for positioning which is executed by a positioning server 40.

In addition, when the user terminal 100 is positioned in a place where the GPS function 130 cannot acquire GPS information, the user terminal 100 can also receive a radio wave from the base station 60 by the transmission/reception function 120, and can upload, instead of the GPS information, the received signal strength indicator information of the radio wave from the base station 60, together with the identification number a of the user terminal 100 and the time stamp indicative of the time of the reception of the radio wave from the base station 60, to the monitoring system 10 from the transmission/reception function 120 via the base station 60. As will be described later, the received signal strength indicator information of the radio wave from the base station 60 is also used for positioning which is executed by the positioning server 40.

Note that the user terminal 100 can upload, instead of the GPS information, both the MAC addresses of the WiFi routers and the received signal strength indicator information of the radio waves from the WiFi routers, and the received signal strength indicator information of the radio wave from the base station 60 and the time stamp, to the monitoring system 10, instead of selectively uploading either the MAC addresses of the WiFi routers and the received signal strength indicator information of the radio waves from the WiFi routers, or the received signal strength indicator information of the radio wave from the base station 60 and the time stamp, to the monitoring system 10.

Note that even when the user terminal 100 can acquire the CPS information, the user terminal 100 may upload, in addition to the GPS information, the MAC addresses of the WiFi routers and the received signal strength indicator information of the radio waves from the WiFi routers, and the received signal strength indicator information of the radio wave from the base station 60 and the time stamp, to the monitoring system 10.

Thereby, the monitoring system 10 can use, for the positioning of the user terminal 100, not only position information determined from the GPS information, but also either position information determined by the positioning server 40 based on the MAC addresses of the WiFi routers and the received signal strength indicator information of the radio waves from the WiFi routers, or position information determined by the positioning server 40 based on the received signal strength indicator information of the radio wave from the base station 60.

On the other hand, unless an acceleration of a predetermined value or more is detected by the acceleration sensor 150, i.e. unless the user terminal 100 moves, the user terminal 100 does not acquire the GPS information, or receive the radio waves from the WiFi routers, or receive the radio wave from the base station 60, or uploads the information to the monitoring system 10. In this manner, when the user terminal 100 does not move, the user terminal 100 sleeps. Thereby, the power of the battery 160 can be saved.

Note that the user terminal 100 is equipped with no operation button. All setting operations for the user terminal 100 (e.g. setting and changing of the interval for upload) are remotely executed via the monitoring system 10 by instructions from the guardian terminal 200. Accordingly, even without the watched person operating the user terminal 100, the user terminal 100 automatically awakes/sleeps, and, when the user terminal 100 awakes, the user terminal 100 uploads the information to the monitoring system 10 at set intervals.

Figure 3:
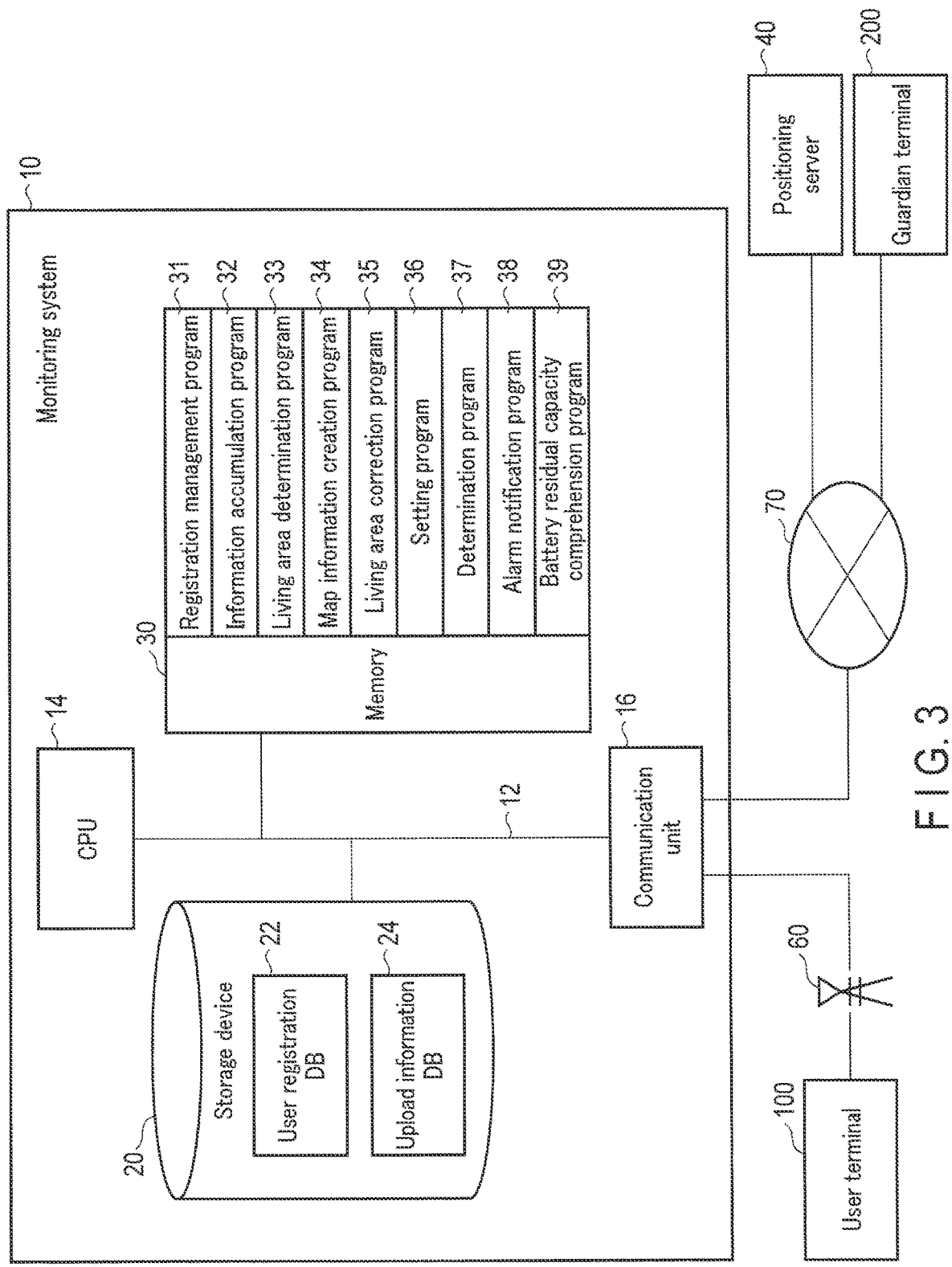
FIG. 3 is a block diagram illustrating a configuration example of the monitoring system to which the monitoring method according to the embodiment of the present invention is applied.

FIG. 3 is a block diagram illustrating a configuration example of the monitoring system to which the monitoring method according to the embodiment of the present invention is applied.

The monitoring system 10 includes a CPU 14, a communication unit 16, a storage device 20 and a memory 30, which are interconnected by a bus 12.

The CPU 14 is a computer, and controls internal operations of the monitoring system 10 according to various programs 31 to 39 stored in the memory 30.

The communication unit 16 can receive, via the base station 60, the information that is uploaded from the user terminal 100. In addition, the communication unit 16 can communicate with the positioning server 40 and the guardian terminal 200 via the communication network 70 such as the Internet.

As the storage device 20, for example, an SSD (Solid State Drive), an HDD (Hard Disk Drive) or the like is used, and the storage device 20 stores a user registration database 22 (hereinafter referred to as "user registration DE" 22) which manages user registration information (identification information a, guardian address b) that is transmitted from the guardian terminal 200, and an upload information database 24 (hereinafter referred to as "upload information DB" 24) which accumulates the information uploaded from the user terminal 100 and the position information determined by the positioning server 40.

A registration management program 31 executes a process for the above-described user registration. The user registration is executed by transmitting the identification number a of the user terminal 100 to the monitoring system 10 from the guardian terminal 200 that is, for example, a smart phone or a PC, via the communication network 70 such as the Internet. Thereby, the transmitted identification number a is received by the communication unit 16, and the mail address, which was used by the guardian terminal 200 to transmit the identification number a, is recognized by the communication unit 16.

FIG. 4 is a data structure diagram illustrating an example of the user registration DB.

The user registration DB 22 includes, as data items, an identification number a, a guardian address b, and a living area position information h. As will be described later, the living area position information h is determined and written by a living area determination program 33. Besides, although omitted in FIG. 4, other information, such as the address of the guardian and the year/month/day of the start of use of the user terminal 100, can be added as data items where necessary.

The registration management program 31 writes the identification number a, which is received by the communication unit 16, in the user registration DB 22. In addition, the registration management program 31 writes the recognized mail address of the guardian terminal 200, in the user registration DB 22 as the guardian address b. Thereby, the user registration process is completed.

If the user registration process is completed, the monitoring system 10 can receive information uploaded from the user terminal 100 having the identification number a. The information, which can be uploaded, can include the identification number a, the GPS information, the MAC address of the WiFi router, the received signal strength indicator information of the radio wave received from the WiFi router by the user terminal 100, the time stamp indicative of the time of reception of this received signal strength indicator information, the received signal strength indicator information of the radio wave received from the base station 60 by the user terminal 100, the battery residual capacity information, and the like.

Note that there is a case where the user terminal 100 is unable to receive any one of the GPS information, the radio wave from the WiFi router, and the radio wave from the base station 60. Accordingly, for example, when the user terminal 100 is unable to receive the CPS information, the information that is uploaded does not include the GPS information. On the other hand, when the user terminal 100 is unable to receive the radio wave from the WiFi router, the information that is uploaded does not include the MAC address of the WiFi router or the received signal strength indicator information of the radio wave from the WiFi router. Besides, when the user terminal 100 is unable to receive the radio wave from the base station 60, the information that is uploaded does not include the received signal strength indicator information of the radio wave from the base station 60 or the time stamp indicative of the time of reception of this received signal strength indicator information.

The information uploaded from the user terminal 100 at the set intervals is received by the communication unit 16. Note that, as will be described later, the interval can freely be set and changed by a setting program 36 according to an instruction from the guardian terminal 200.

Based on the uploaded information, an information accumulation program 32 writes corresponding information in respective data items designated in the upload information DB 24.

FIG. 5 is a data structure diagram illustrating an example of the upload information DB.

The upload information DB 24 includes, as data items, a time stamp c, an identification number a, GPS position information d, WiFi position information e, base station position information f, and battery residual capacity information g. Besides, although omitted in FIG. 5, such information as the MAC address of the WiFi router, the received signal strength indicator information of the radio wave from the WiFi router, and the received signal strength indicator information of the radio wave from the base station 60, can be added as data items where necessary.

When the uploaded information includes the identification number a and GPS information, the information accumulation program 32 accumulates the identification number a and GPS information in the upload information DB 24 as the identification number a and GPS position information d. In addition, the information accumulation program 32 accumulates the time stamp included in the GPS information in the upload information DB 24 as time stamp c.

On the other hand, when the uploaded information includes the MAC address of the WiFi router and the received signal strength indicator information of the radio wave from the WiFi router, the information accumulation program 32 accumulates the time stamp included in the received signal strength indicator information in the upload information DB 24 as the time stamp c, and outputs the MAC address and the received, signal strength indicator information to the positioning server 40 from the communication unit 16 via the communication network 70.

Furthermore, when the uploaded information includes the received signal strength indicator information of the radio wave from the base station 60 and the time stamp, the information accumulation program 32 accumulates the time stamp in the upload information DB 24 as the time stamp c, and outputs the received signal strength indicator information of the radio wave from the base station 60 to the positioning server 40 via the communication network 70.

When the MAC address and the received signal strength indicator information are transmitted from the communication unit 16 to the positioning server 40, the positioning server 40 determines the position of the user terminal 100, based on these information pieces, and returns the corresponding position information (e.g. latitude/longitude information) as the WiFi position information e to the communication unit 16 via the communication network 70.

In addition, when the received signal strength indicator information of the radio wave from the base station 60 is transmitted from the communication unit 16 to the positioning server 40, the positioning server 40 determines the position of the user terminal 100, based on this information, and returns the corresponding position information (e.g. latitude/longitude information) as the base station position information f to the communication unit 16 via the communication network 70.

By utilizing the positioning server 40, the monitoring system 10 can determine the position of the user terminal 100 even in a place where a GPS signal cannot be acquired, such as on a platform of a subway. Since the positioning server 40 can be implemented by using publicly known art such as Geolocation provided by Google, a further detailed description is omitted.

If the WiFi position information e and/or base station position information f is returned from the positioning server 40 to the communication unit 16, the information accumulation program 32 uploads the WiFi position information e and/or base station position information f to the upload information DB 24, with WiFi position information e and/or base station position information f being correlated with the corresponding time stamp.

In this manner, each time the information is uploaded from the user terminal 100, at least one of the position information pieces d, e and f of the user terminal 100 is correlated with the time stamp c, and accumulated in the upload information DB 24.

In this manner, since the monitoring system 10 accumulates the position information of each user terminal 100 in the upload information DB 24 in a batchwise manner, it suffices that each user terminal 100 has only a minimum necessary memory capacity, and the cost of the user terminal 100 can be held down.

The living area determination program 33 determines the living area that is the usual area of activity of the watched person, based on the time stamp c, by setting as a target the position information d, e, f, which was accumulated in a predetermined period, among the position information d, e, f accumulated in the upload information DB 24. A default value, such as the past 30 days, is set for the predetermined period. However, as will be described later, the predetermined period can be set and changed to a freely chosen period by performing a necessary input operation from the guardian terminal 200 by using the setting program 36.

Furthermore, the living area determination program 33 can determine the living area more finely, by using the position information d, e, f, which was accumulated under a predetermined condition, among the position information d, e, f accumulated in the predetermined period.

For example, by setting the predetermined condition to be weekdays, the living area for weekdays can be determined based on the time stamp c, by setting as a target only the position information d, e, f accumulated on weekdays. In addition, by setting the predetermined condition to be weekends/holidays, the living area for weekends/holidays can be determined based on the time stamp C, by setting as a target only the position information d, e, f accumulated on weekends/holidays. Furthermore, by setting the predetermined condition to be a specific day of the week (e.g. Friday), the living area for the specific day of the week can be determined based on the time stamp c, by setting as a target only the position information d, e, f accumulated on the specific day of the week.

Besides, as the predetermined condition, a specific time zone can be set. Thereby, based on the time stamp c, in addition to the above-described setting of the day of the week, the living area can be determined more finely, such as a living area in the morning (e.g. from 6 a.m. to 10 a.m.) of weekdays, a living area in the daytime (e.g. from 10 a.m. to 5 p.m.) of weekdays, or a living area in the nighttime (e.g. from 5 p.m. to 11 p.m.) of weekdays. Note that only the time zone can be set as the predetermined condition, without setting the day of the week.

In general, the usual area of activity greatly differs between weekdays and weekends/holidays, and between the morning, daytime and nighttime, and cannot categorically be determined. Thus, the living area determination program 33 can determine various living areas in accordance with the predetermined period, the predetermined condition, and a predetermined standard to be described later.

As will be described later, the predetermined period, predetermined condition and predetermined standard can also be set and changed by performing a necessary input operation from the guardian terminal 200 by using the setting program 36.

Concrete examples of the process for determining the living area, which is executed by the living area determination program 33, will be described with reference to the accompanying drawings. Note that, in the examples to be described below, a description is given of cases where the living area is determined based on the position information d, e, f accumulated in the past 30 days as the predetermined period. However, as described above, also in the case of further setting the predetermined condition such as the day of the week or the time zone, the process for the living area determination is the same, with only the position information that is the target to be considered being different.

The living area determination program 33 sets, as a target, only the position information d, e, f, which was accumulated in the set predetermined period (e.g. past 30 days), among the position information d, e, f of the specific user terminal 100, which was accumulated in the upload information DB 24.

The living area determination program 33 can determine the living area by various methods, as will be described below, by using any one of the position information pieces d, e and f accumulated in the predetermined period.

Note that when two or more of the GPS position information d, the WiFi position information e and the base station information f are accumulated for the time stamp c which is identical or can be considered to be identical, the living area determination program 33 uses any one of these position information pieces, or one position information determined by proper weighting from the position information pieces.

Figure 6:
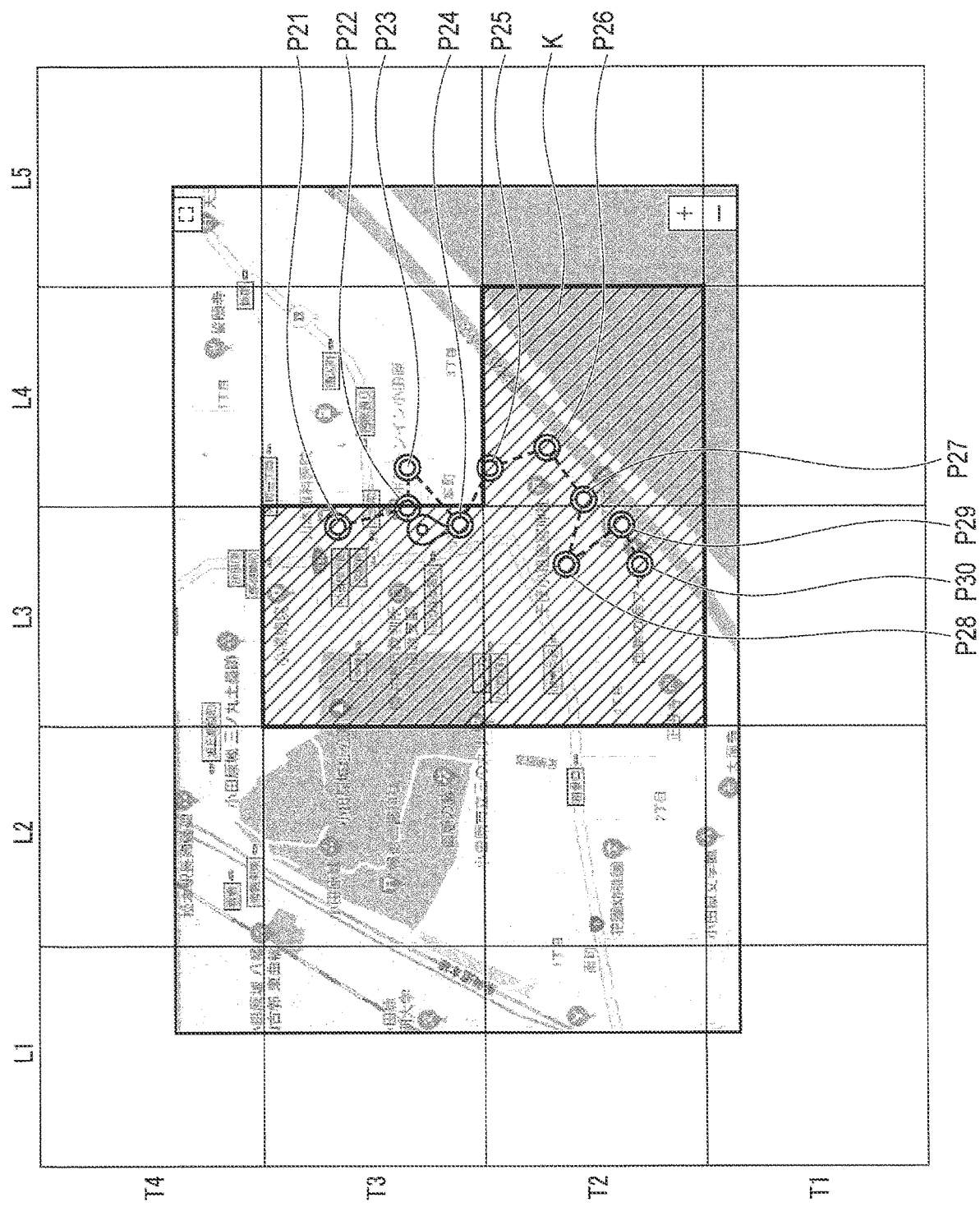
FIG. 6 is a view for describing an example of a first determination method of a living area.

FIG. 6 is a view for describing an example of a first determination method of the living area.

In the first determination method, the living area is determined by using a map which is divided into a plurality of sections in advance.

A map exemplarily illustrated in FIG. 6 is a well-known UTM grid map, and is divided by a plurality of square sections each having a size of, for example, 100 m in vertical and in horizontal.

The living area determination program 33 determines, as a living area, a section to which the position information accumulated in the predetermined period belongs a predetermined number of times or more (e.g. two times), among the sections on the map.

For example, on the map exemplarily illustrated in FIG. 6, plots P21 to P30 correspond to the position information accumulated in the predetermined period. The plots P21, P22 and P24 are included in a section L3T3, the plots P28, P29 and P30 are included in a section L3T2, and the plots P25, P26 and P27 are included in a section L4T2.

Specifically, since the position information accumulated in the predetermined period belongs to the section L3T3, section L3T2 and section L4T2 two or more times, the living area determination program 33 determines, as a living area K, an area in which the section L3T3, section L3T2 and section L4T2 are combined.

On the other hand, since only the plot P23 is included in a section L4T3, and the position information accumulated in the predetermined period belongs thereto, for example, only once, this section is not regarded as the living area K.

Note that when the living area determination program 33 determines the living area by the first determination method, the map to be used is not necessarily limited to the map divided into square sections, like a UTM grid map. A map divided in a freely chosen shape can be used. For example, like an address division map, a map that is divided on an address-by-address basis can be utilized to determine the living area. This will be described with reference to FIG. 7.

Figure 7:
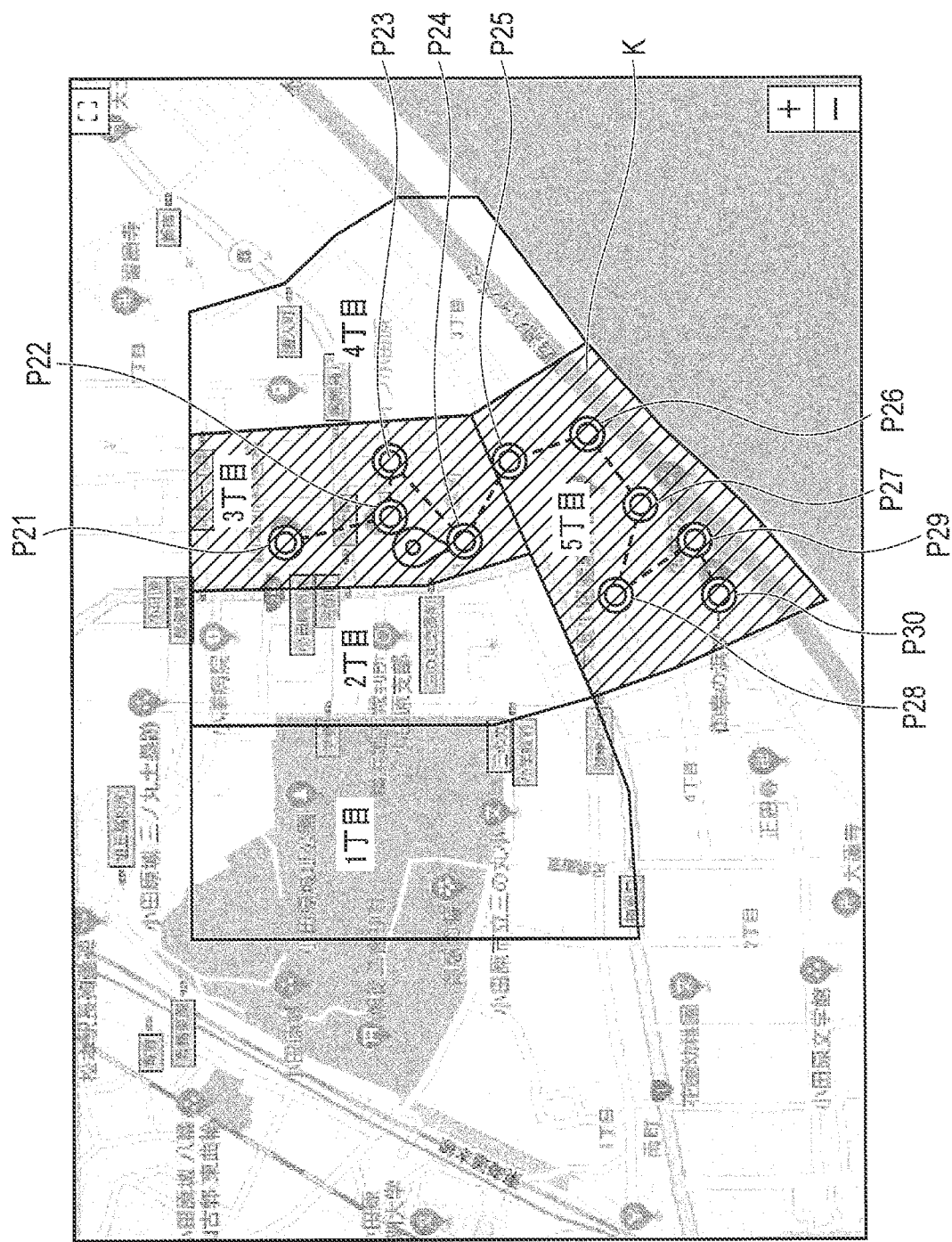
FIG. 7 is a view for describing another example of the first determination method of the living area.

FIG. 7 is a view for describing another example of the first determination method of the living area.

It should be noted that in the address-division map illustrated in FIG. 7, only sections of 1-chome (a numbered subdivision of an area in an address) to 5-chome are displayed in a simplified manner for the purpose of description.

On the map exemplarily illustrated in FIG. 7, too, plots P21 to P30 correspond to the position information accumulated in the predetermined period. The plots P21 to P24 are included in 3-chome illustrated in FIG. 7, and the plots P25 to P30 are included in 5-chome.

Specifically, since the position information belongs to 3-chome and 5-chome, for example, two or more times, the living area determination program 33 determines, as a living area K, an area in which 3-chome and 5-chome are combined.

In addition, the living area determination program 33 can also determine the living area K by a second determination method to be described below.

FIG. 8 is a view for describing an example of the second determination method of the living area.

In the second determination method, although the living area K can be determined by using the map divided into sections, as illustrated FIG. 6 and FIG. 7, the living area K can also be determined by using a map which is not divided into sections, as illustrated in FIG. 8.

For example, on the map exemplarily illustrated in FIG. 8, plots P21 to P30 correspond to the position information accumulated in the predetermined period.

In the second determination method, as exemplarily illustrated in FIG. 8, the living area determination program 33 can determines, as the living area K, a minimum projection-shaped area including all plots P21 to P30 displayed on the map.

Furthermore, the living area determination program 33 can also determine the living area K by a third determination method to be described below.

Figure 9:
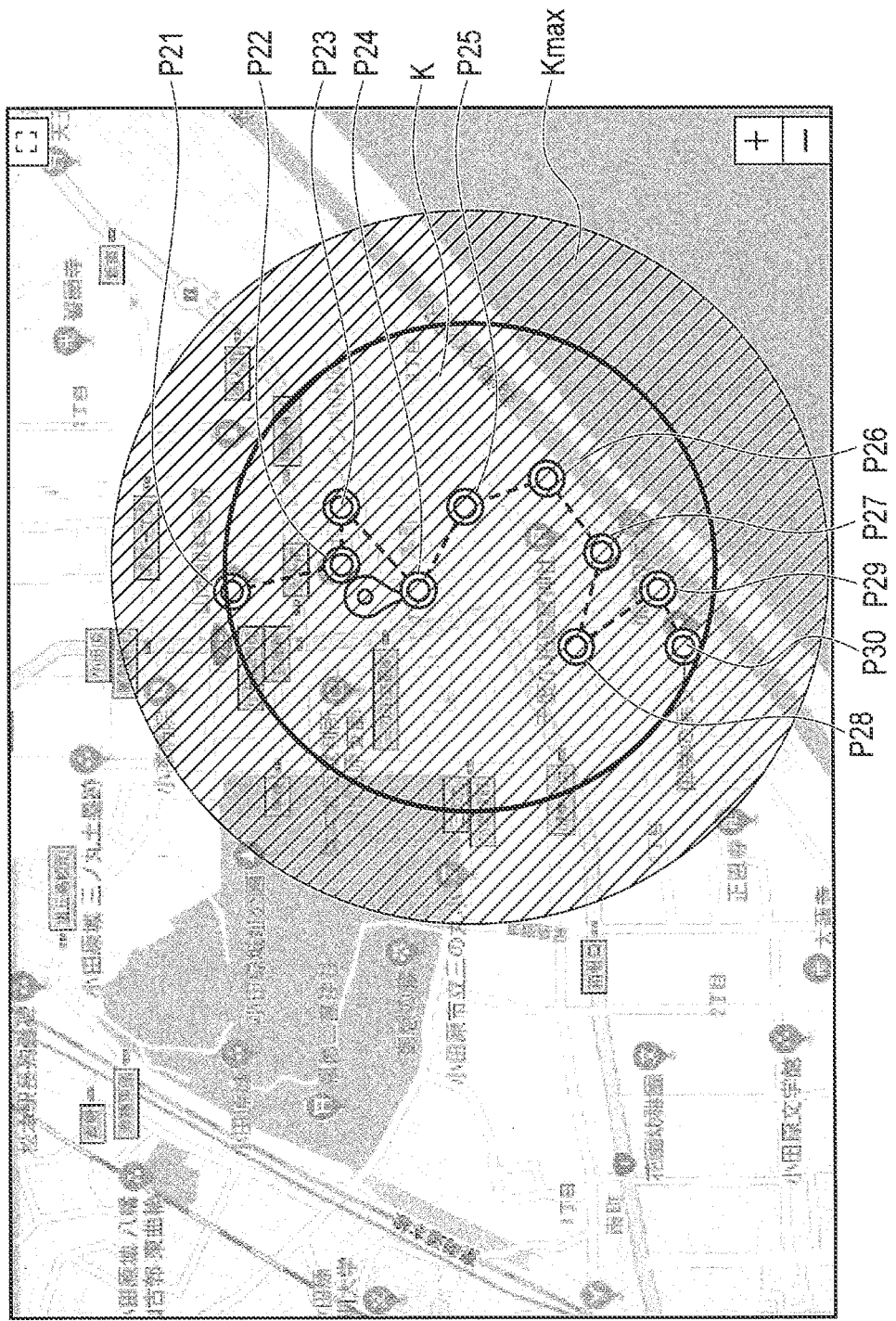
FIG. 9 is a view for describing an example of a third determination method of the living area.

FIG. 9 is a view for describing an example of the third determination method of the living area.

In the third determination method, too, although the living area K can be determined by using the map divided into sections, as illustrated FIG. 6 and FIG. 7, the living area K can also be determined by using a map which is not divided into sections, as illustrated in FIG. 9.

For example, on the map exemplarily illustrated in FIG. 9, plots P21 to P30 correspond to the position information accumulated in the predetermined period.

In the third determination method, as exemplarily illustrated in FIG. 9, the living area determination program 33 can also determine, as the living area K, a minimum circular area including all plots P21 to P30 displayed on the map.

Furthermore, the living area determination program 33 can also determine the living area K by a fourth determination method to be described below.

Figure 10:
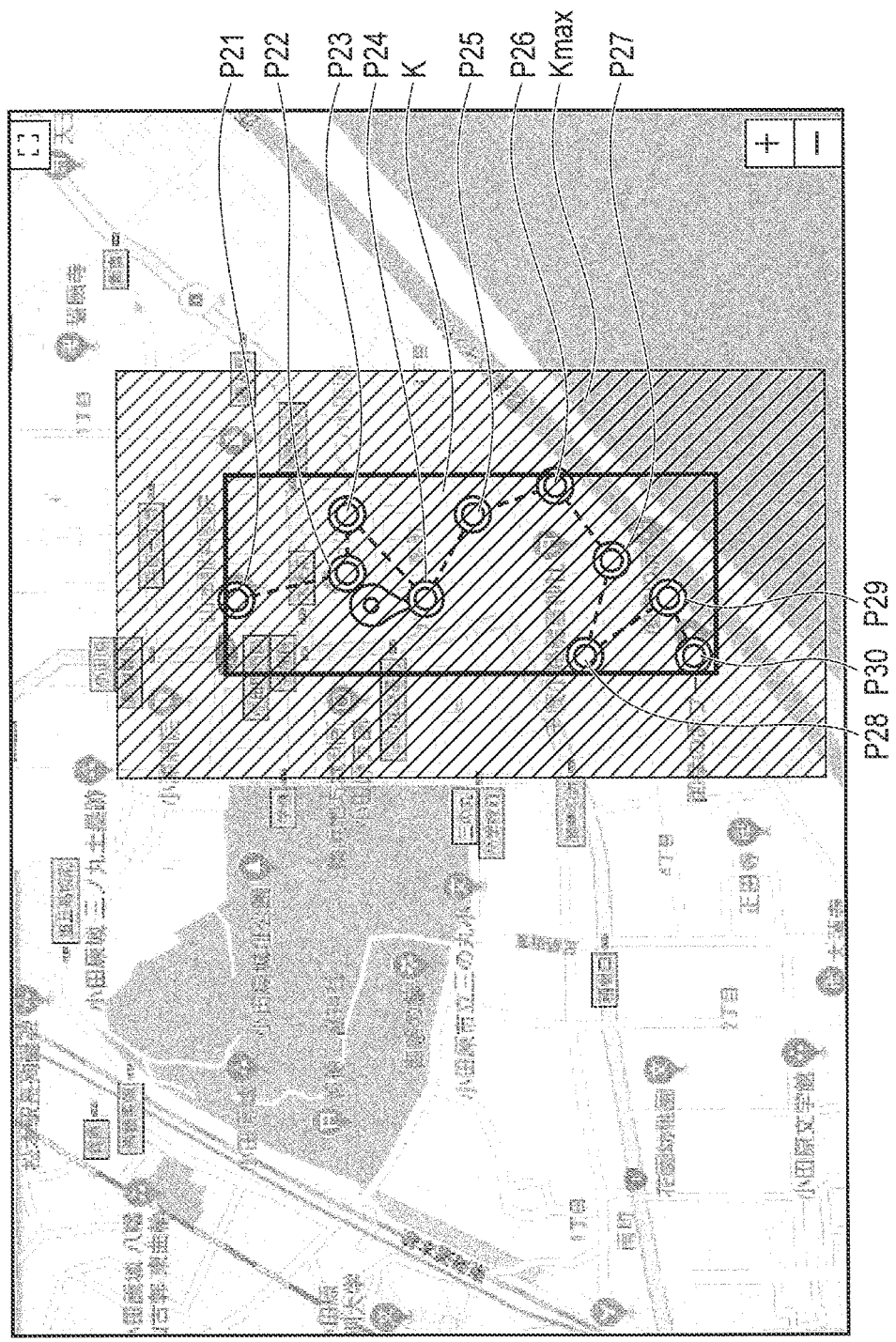
FIG. 10 is a view for describing an example of a fourth determination method of the living area.

FIG. 10 is a view for describing an example of the fourth determination method of the living area.

In the fourth determination method, too, although the living area K can be determined by Using the map divided into sections, as illustrated FIG. 6 and FIG. 7, the living area K can also be determined by using a map which is not divided into sections, as illustrated in FIG. 10.

For example, on the map exemplarily illustrated in FIG. 10, plots P21 to P30 correspond to the position information accumulated in the predetermined period.

In the fourth determination method, as exemplarily illustrated in FIG. 10, the living area determination program 33 can also determine, as the living area K, a minimum rectangular area including all plots P21 to P30 displayed on the map.

In addition, the living area determination program 33 can also determine the living area K by a fifth determination method to be described below.

Figure 11:
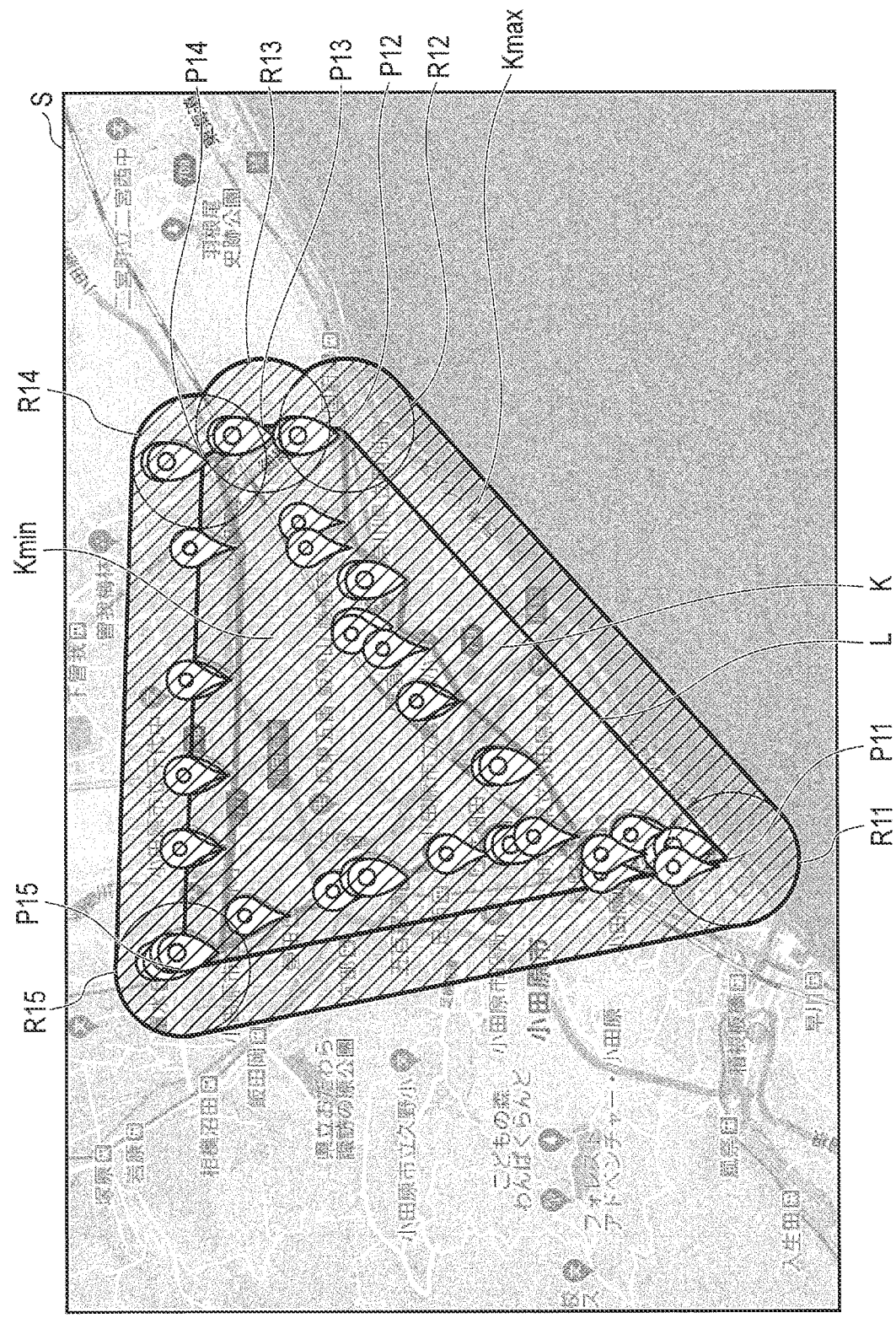
FIG. 11 is a view for describing an example of a fifth determination method of the living area.

FIG. 11 is a view for describing an example of the fifth determination method of the living area.

In the fifth determination method, too, although the living area K can be determined by using the map divided into sections, as illustrated FIG. 6 and FIG. 7, the living area K can also be determined by using a map which is not divided into sections, as illustrated in FIG. 11.

For example, on the map exemplarily illustrated in FIG. 11, plots indicated by water-drop marks correspond to the position information accumulated in the predetermined period.

In the fifth determination method, as exemplarily illustrated in FIG. 11, the living area determination program 33 determines, as the living area K, a minimum area including all plots displayed on the map. Thus, some plots P11 to P15 located on an outermost part of the living area K are selected from among the displayed plots, and an area, which is formed by connecting neighboring plots by straight lines L by setting only the selected plots as targets, is determined as the living area K.

Furthermore, the living area determination program 33 can also determine the living area K by a sixth determination method to be described below.

Figure 12:
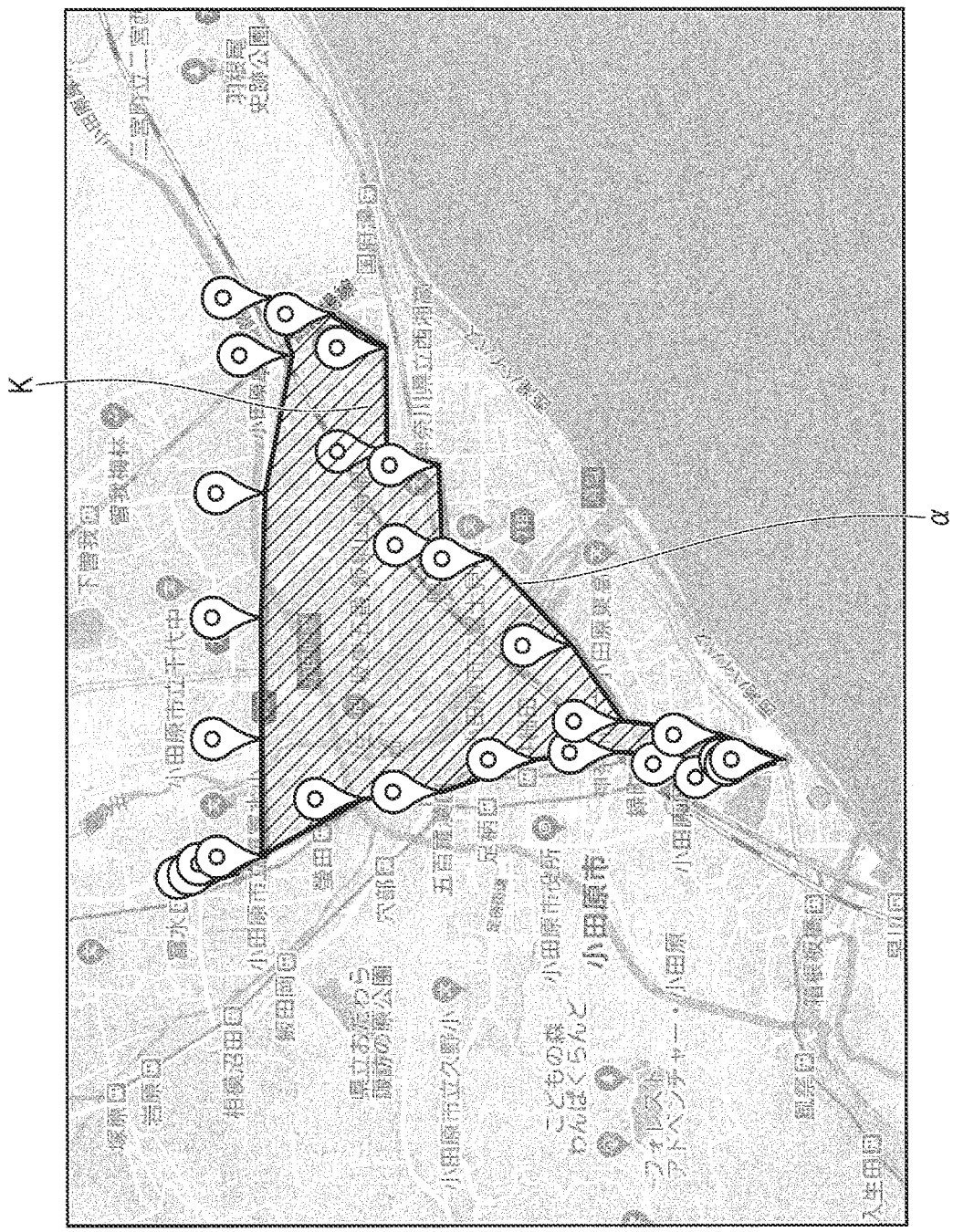
FIG. 12 is a view for describing an example of a sixth determination method of the living area.

FIG. 12 is a view for describing an example of the sixth determination method of the living area.

In the sixth determination method, the living area determination program 33 determines the living area K by using a path of a road or a railway. Accordingly, it is necessary to use a map including information of the path of a road or a railway. If the information of the path of a road or a railway is included, the living area K can be determined by using a map divided into sections, as illustrated FIG. 6 and FIG. 7, or by using a map which is not divided into sections.

On the map exemplarily illustrated in FIG. 12, plots indicated by water-drop marks correspond to the position information accumulated in the predetermined period.

In the sixth determination method, the living area determination program 33 determines, as the living area K, an area which is formed by connecting neighboring plots along a path of a road or a railway, by setting all plots displayed on the map as targets. Accordingly, a line α, which connects the neighboring plots, is not necessarily a straight line L as in FIG. 11. For example, as exemplarily illustrated in FIG. 12, the line α may become a straight line or a curve along the path of a road or a railway.

The above-described determination methods of the living area K are merely examples. The living area K may be determined by modifying a part of any one of the determination methods, or the living area K may be determined by a method that is a combination of determination methods. Furthermore, the living area K may be determined by some other determination method.

For example, circles of a certain radius, which center on respective plots, are drawn, and the drawn circles are set as a plurality of sections. If the circle of a certain section includes another plot, this means that the distance between the plots is less than the radius. Thus, this circle of the certain section can be determined as the living area.

The living area determination program 33 writes the position information, which defines the thus determined living area K, in the user registration DB 22 as the living area position information h of the corresponding identification number a.

A map information creation program 34 creates map information in which the living area K is specified on the map, based on the living area position information h written in the user registration DB 22. Then, when a request is issued from the guardian terminal 200, this map information is transmitted to the guardian terminal 200 from the communication unit 16 via the communication network 70.

The guardian can cause the map information, which is transmitted to the guardian terminal 200, to be displayed on the display screen of the guardian terminal 200. Thereby, the guardian can visually grasp the living area K of the watched person.

When the guardian thinks that the determined living area K is not appropriate, and wishes to correct the determined living area K, the guardian can correct the living area K by using the setting program 36.

Figure 13:
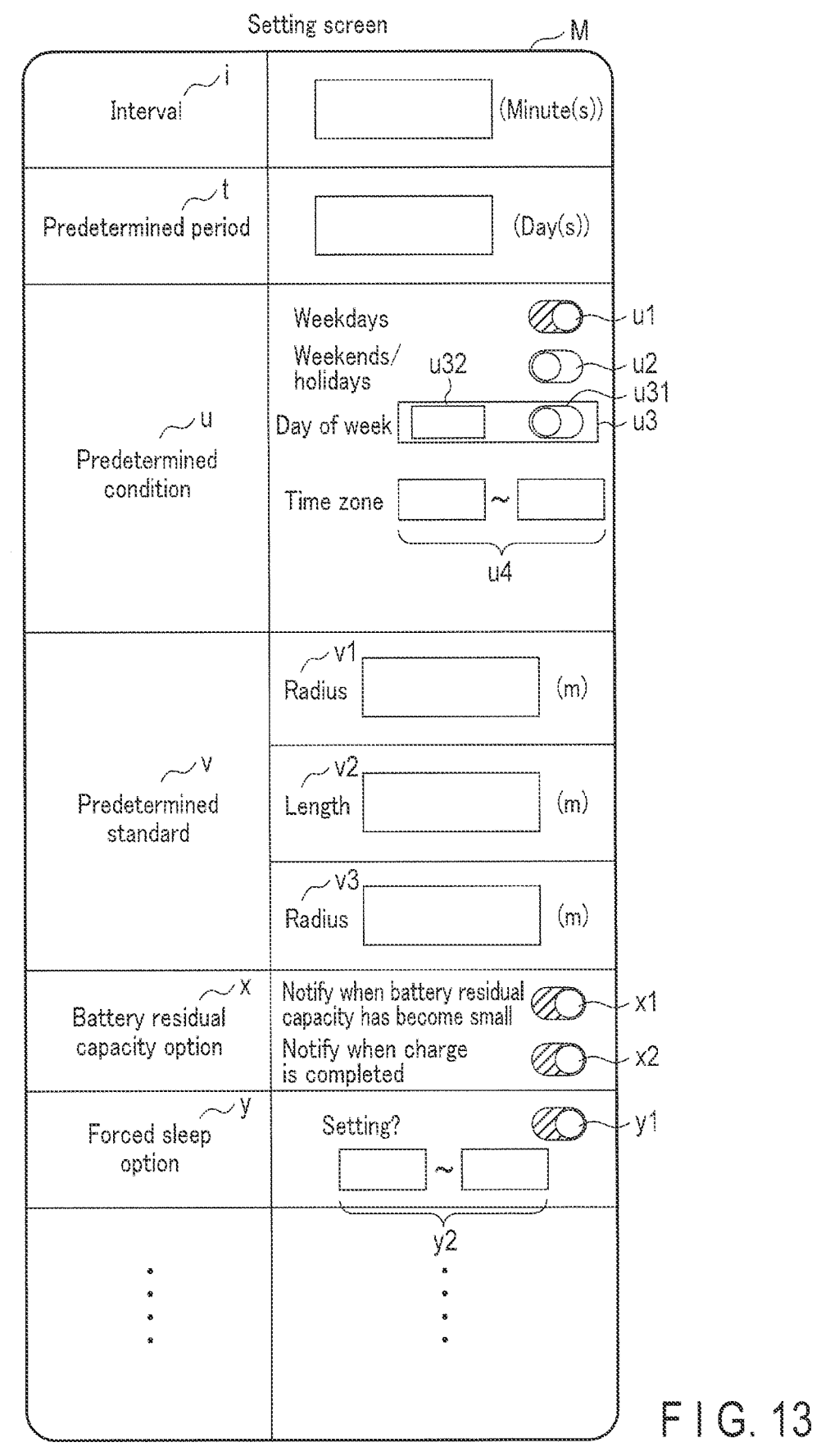

If the setting program 36 is activated, the setting program 36 causes a setting screen M as illustrated in FIG. 13 to be displayed on the display screen of the guardian terminal 200 which is the source of the request.

FIG. 13 is a schematic view illustrating an example of the setting screen.

The setting screen M illustrated in FIG. 13 displays, for example, items for inputting an interval i, a predetermined period t, a predetermined conduction u (weekdays u1, weekends/holidays u2, day of week u3, time zone u4), a predetermined condition v (radius v1, length v2, radius v3), a battery residual capacity option x, and a forced sleep option y.

Using the input function of the guardian terminal 200, the guardian inputs, from the setting screen M, a numerical value or selects a desired content from options prepared in advance, thus being able to set in the monitoring system 10 the interval i, predetermined period t, predetermined conduction u (weekdays u1, weekends/holidays u2, day of week u3, time zone u4), predetermined condition v (radius v1, length v2, radius v3), battery residual capacity option x, forced sleep option y, or the like.

Further, the setting contents of the interval i, battery residual capacity option x and forced sleep option y are transmitted from the monitoring system 10 to the user terminal 100 via the communication unit 16, received by the transmission/reception function 120 of the user terminal 100, and set in the user terminal 100.

Note that, in addition to the items exemplarily illustrated in FIG. 13, necessary items may be added to the setting screen M where necessary, thereby enabling further various settings on the monitoring system 10.

By the above setting by means of the setting screen M, the monitoring system 10 can also determine a plurality of living areas K, as will be described below.

In general, life patterns are different between weekdays and weekends/holidays. Thus, the monitoring system 10 is configured to be able to determine living areas for respective predetermined conditions u, such as a living area for weekdays, a living area for weekends/holidays, a living area for a specific day of the week, and a living area in a specific time zone.

For example, if a button of weekdays u1 is set in an ON state, the living area determination program 33 can determine the living area K for weekdays, by setting as a target only the position information uploaded to the upload information DB 24 in the weekdays in the predetermined period t. Similarly, if a button of weekends/holidays u2 is set in an ON state, the living area determination program 33 can determine the living area K for weekends/holidays, by setting as a target only the position information uploaded to the upload information DB 24 in the weekends/holidays in the predetermined period t. Further, if a button u31 of a specific day of the week u3 is set in an ON state and a desired day of the week (e.g. "Tuesday") is selected or input in an input field u32, the living area determination program 33 can determine the living area K for Tuesday, by setting as a target only the position information uploaded to the upload information DB 24 on Tuesday in the predetermined period t. Note that the button of the weekdays u1, the button of the weekends/holidays u2, and the designation of the specific day of the week u3 are configured not to be set in the ON state at the same time.

In addition, the time zone u4 can be set independently, or can be set in combination with any one of the weekdays u1, the weekends/holidays u2 and the specific day of the week u3. For example, if "Tuesday" is designated in the input field u32 and "10:00"~"17:00" is designated in the time zone u4 by selection or input, the living area determination program 33 can determine the living area K by setting as a target only the position information uploaded to the upload information DB 24 during 10:00 to 17:00 on Tuesday in the predetermined period t.

In this manner, if the guardian designates a desired condition in the predetermined condition u of the setting screen M, the setting program 36 narrows down the position information that is set as the target for determining the living area K, and the living area determination program 33 determines the living area K by setting the narrowed-down position information as a target. Thus, the living area K can be finely set based on the condition relating to time.

In addition, the Monitoring system 10 can enlarge or reduce the determined living area K. This function will be described below.

In general, the area of activity of a child becomes wider with the growth of the child. Conversely, the area of activity of an elderly person becomes narrower with the aging. Accordingly, when the watched person is the child, the guardian may wish to enlarge the living area K, which was determined by the living area determination program 33, in accordance with the growth of the child. On the other hand, conversely, when the watched person is the elderly person, the guardian may wish to narrow the living area K, which was determined by the living area determination program 33.

In order to cope with this situation, the monitoring system 10 has a function of enlarging or reducing the living area K, which was once determined by the living area determination program 33, in accordance with a request from the guardian terminal 200. This function can be implemented by setting values in the field of the predetermined standard v (radius v1, length v2, radius v3) of the setting screen M that is displayed by the setting program 36. Concrete examples will be described with reference to the above-described FIG. 9, FIG. 10 and FIG. 11.

FIG. 9 illustrates the living area K, which is defined by the minimum circular shape.

In the case of enlarging or reducing the circular living area K as exemplarily illustrated in FIG. 9, such designation input is executed that "+☐☐" (e.g. "+100" when the radius is increased by 100 m) is input to the field of the radius v1 of the predetermined standard v on the setting screen M when the radius of the present living area K is to be increased, and "−☐☐" (e.g. "−100" when the radius is decreased by 100 m) is input to the field of the radius v1 when the radius of the present living area K is to be decreased. If the designation input is executed, the setting program 36 causes the living area determination program 33 to vary the size of the circular living area K in a concentric manner in accordance with the designation input. Thus, by enlarging or reducing the circular living area K, the living area determination program 33 can redetermine the living area K. FIG. 9 illustrates a redetermined living area Kmax, which is redetermined by enlarging the living area K, together with the living area K before the redetermination.

FIG. 10 illustrates the living area K, which is defined by the minimum rectangular shape.

In the case of enlarging or reducing the rectangular living area K as exemplarily illustrated in FIG. 10, such designation input is executed that "+☐☐" (e.g. "+100" in the case of enlargement to the outside by 100 m) is input to the field of the length v2 of the predetermined standard v on the setting screen M when the present living area K is to be enlarged to the outside, and "−☐☐" (e.g. "−100" in the case of reduction to the inside by 100 m) is input to the field of the length v2 when the present living area K is to be reduced to the inside. If the designation input is executed, the setting program 36 causes the living area determination program 33 to vary the size of the rectangular living area K in accordance with the designation input. Thus, by enlarging or reducing the rectangular living area K, the living area determination program 33 can redetermine the living area K. FIG. 10 illustrates a redetermined living area Kmax, which is redetermined by enlarging the living area K, together with the living area K before the redetermination.

FIG. 11 illustrates the living area K of a freely chosen shape, which is defined as a minimum area including all position information.

In the case of enlarging or reducing the living area K of a freely chosen shape, such designation input is executed that "+☐☐" (e.g. "+100" in the case of enlargement to the outside by 100 m) is input to the field of the radius v3 of the predetermined standard v on the setting screen M when the present living area K is to be enlarged to the outside, and "−☐☐" (e.g. "−100" in the case of reduction to the inside by 100 m) is input to the field of the radius v3 when the present living area K is to be reduced to the inside. If the designation input is executed, the setting program 36 causes the living area determination program 33 to execute a process to be described below, thereby varying the size of the living area K of the freely chosen shape in accordance with the designation input.

Specifically, an enlarged living area Kmax, or a reduced living area Kmin, is determined by moving a circle R along straight lines L which define the outer periphery of the living area K. This will be generally described with reference to FIG. 14.

Figure 14:
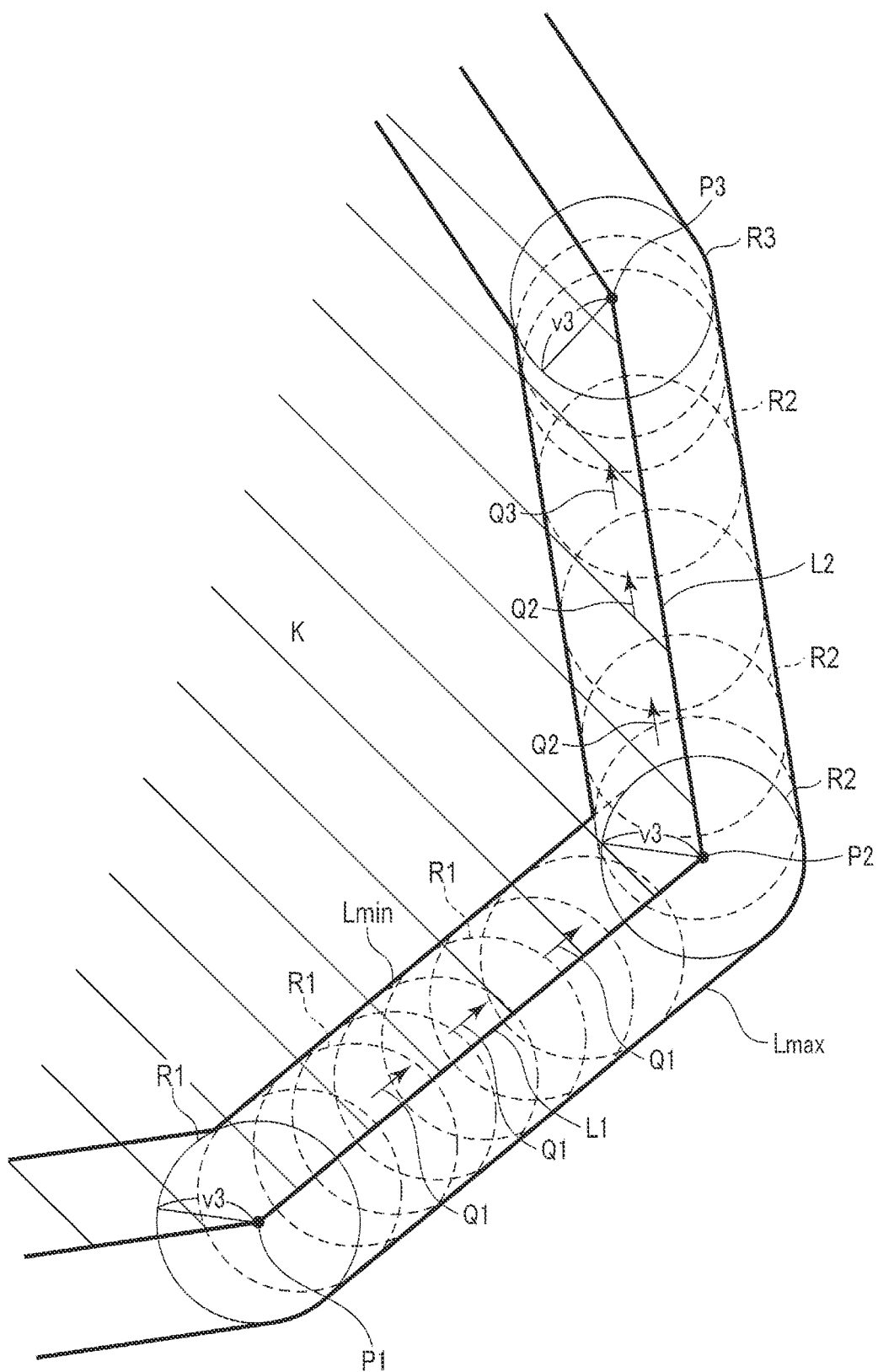
FIG. 14 is a schematic view exemplarily illustrating a part of straight lines which define an outer periphery of the living area.

FIG. 14 is a schematic view exemplarily illustrating some of straight lines which define an outer periphery of the living area.

In FIG. 14, a straight line L1 connecting the plot P1 and plot P2, and a straight line L2 connecting the plot P2 and plot P3 are a part of straight lines L which define the outer periphery of the living area K.

Here, if a circle R1 having a radius v3 and centering on the plot P1 is drawn, and the center of the circle R1 is moved to the neighboring plot P2 along the straight line L1, as indicated by an arrow Q1, the outer circumference of the circle R1 moves from the plot P1 to plot R2 while drawing loci as indicated by a straight line Lmax and a straight line Lmin. Similarly, if a circle R2 having a radius v3 and centering on the plot P2 is drawn, and the center of the circle R2 is moved to the neighboring plot P3 along the straight line L2, as indicated by an arrow Q2, the outer circumference of the circle R2 moves from the plot P2 to plot P3 while drawing loci as indicated by the straight line Lmax and straight line Lmin.

By defining the outer periphery of the living area Kmax by the thus obtained straight line Lmax, the enlarged living area Kmax can be determined for the living area K of the freely chosen shape, too. In addition, by defining the outer periphery of the living area Kmin by the straight line Lmin, the reduced living area Kmin can be determined for the living area K of the freely chosen shape, too.

In this manner, even for the living area K of the freely chosen shape, the living area determination program 33 can redetermine the living area K by enlarging or reducing the size. FIG. 11 exemplarily illustrates the living area Kmax which is enlarged by the redetermination, and the living area Kmin which is reduced by the redetermination, together with the living area K before the redetermination.

Note that, in the above, the example was described in which the amount of enlargement or reduction is designated by inputting numerical values to the fields of the radius v1, length v2 and radius v3 of the predetermined standard v on the setting screen M. However, instead of inputting the numerical values, the values of the radius v1, length v2 and radius v3 of the predetermined standard v can be designated by other methods. This will be described with reference to FIG. 15.

Figure 15:
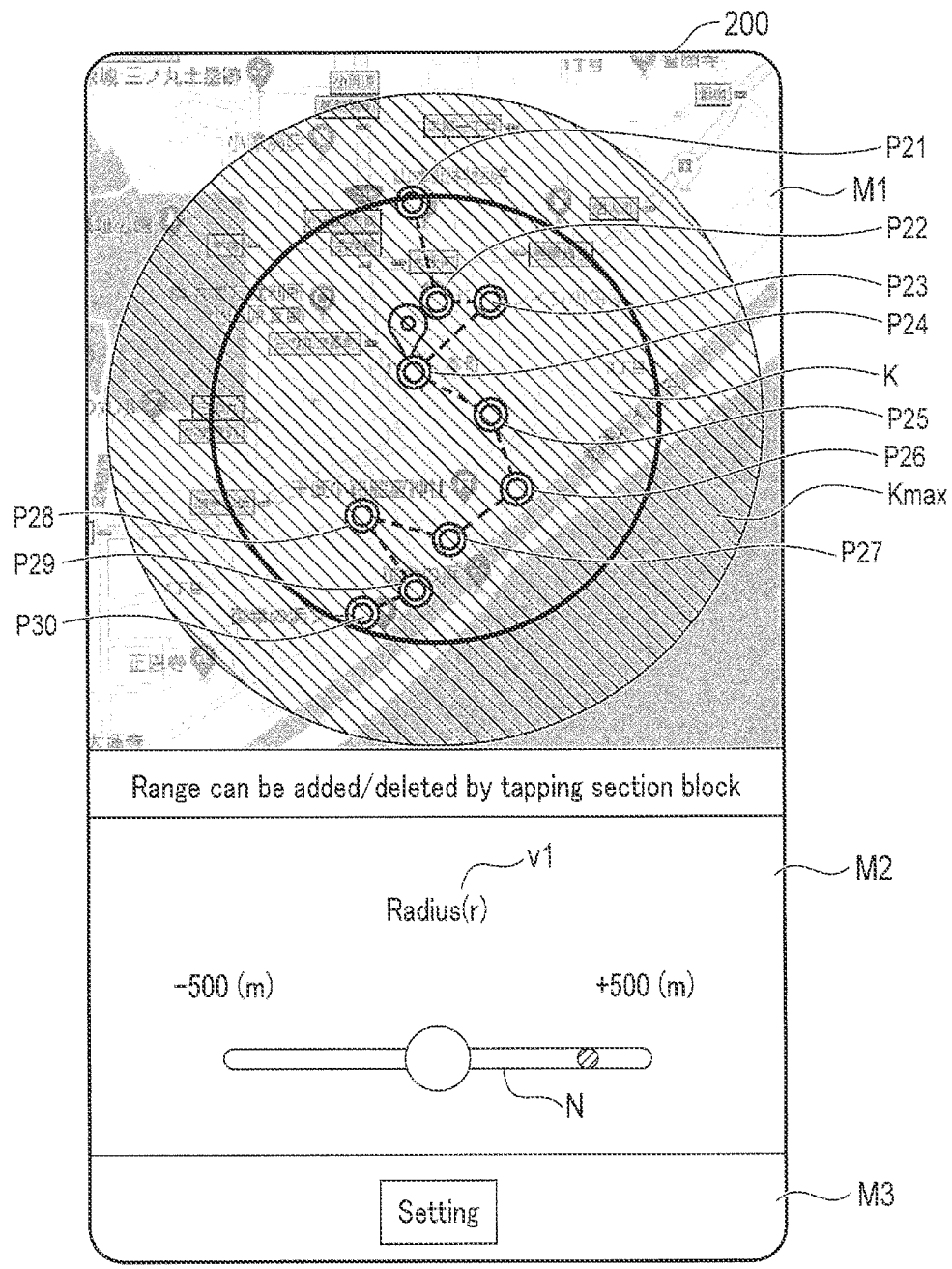
FIG. 15 is a schematic view illustrating a display example on a display screen of a guardian terminal for setting a predetermined standard.

FIG. 15 is a schematic view illustrating a display example on the display screen of the guardian terminal for setting the predetermined standard.

FIG. 15 illustrates an example of a state in which the setting program 36 is activated and a setting screen, which is used in place of the setting screen M, is displayed on the display screen of the guardian terminal 200. This display screen displays a map display portion M1, a slider display portion M2, and a setting decision portion M3.

In the map display portion M1, a circular living area K, as exemplarily illustrated in FIG. 9, is displayed.

In the slider display portion M2, a slider N for setting the value of the radius v1 of the predetermined standard v is displayed.

The guardian can designate the value of the radius v1 by moving the slider N by using an input function (e.g. touch-panel function) of the guardian terminal 200, and can transmit the value of the radius v1 to the monitoring system 10 by pressing a setting button of the setting decision portion M3.

In accordance with the transmitted value of the radius v1, the living area K is redetermined by the living area determination program 33, and the enlarged living area Kmax, or the reduced living area Kmin, is displayed an the map display portion M1.

Note that, in FIG. 15, the example was described in which the value of the radius v1 is input by the slider N. Similarly, the value of the length v2 or the value of the radius v3 can be input by the slider N.

In this manner, the guardian can input the condition for determining the living area K.

The monitoring system 10 additionally provides a living area correction program 35 for enabling the guardian to freely set the living area K.

FIG. 16 illustrates map information for describing a setting method of the living area by the living area correction program.

If the guardian operates the guardian terminal 200 and activates the living area correction program 35, the guardian terminal 200, as exemplarily illustrated in FIG. 16, displays map information S indicating plots corresponding to the position information that is set as the target for determining the living area K.

The guardian can designate a range, B1~B8, of the living area K by tracing the map information S on the display screen by a finger. In this case, the guardian can designate the range, B1~B8, of the living area K by referring to the displayed plots, or can freely designate the range, B1~B8, of the living area K, regardless of the displayed plots.

Thereafter, the guardian transmits the map information S, in which the range, B1~B8, of the living area K is designated, to the monitoring system 10 from the guardian terminal 200.

The map information S, in which the range, B1~B8, is designated, is received by the communication unit 16. In addition, the guardian address b of the guardian terminal 200 that is the source of transmission is also recognized in the communication unit 16.

If the map information S, in which the range, B1~B8, is designated, is received by the communication unit 16, the living area correction program 35 refers to the user registration DB 22 and updates the living area position information h of the recognized guardian address b to the living area position information determined by the designated range, B1~B8, thereby updating the user registration DB 22.

In this manner, by the living area correction program 35, the guardian is enabled to freely determine the living area K.

After the living area K (including the enlarged living area Kmax and reduced living area Kmin) is determined as described above, a determination program 37 determines a positional relationship between the position of the user terminal 100 and the living area K, for example, a positional relationship as to whether the position of the user terminal 100 is inside the living area K or outside the living area K, based on the position information d, e, f of the user terminal 100, which is determined based on the information uploaded from the user terminal 100.

Thus, each time new information is uploaded from the user terminal 100 and new information (time stamp c, identification information a, GPS position information d, WiFi position information e, base station position information f, battery residual capacity information g, and the like) is written, the determination program 37 refers to the user registration DB 22 and acquires the living area position information h of the user terminal 100 of the corresponding identification number a from the upload information DB 24. Then, the determination program 37 determines whether the position of the user terminal 100 is inside the living area K or outside the living area K, by comparing any one of the GPS position information d, WiFi position information e and base station position information f, which are written in the upload information DB 24, with the living area position information h.

Note that when two or More of the GPS position information d, the WiFi position information e and the base station information f are accumulated for the time stamp e which is identical or can be considered to be identical, the determination program 37 determines whether the position of the user terminal 100 is inside the living area K or outside the living area K, by comparing any one of these position information pieces, or one position information determined by proper weighting from the position information pieces, with the living area position information h.

When the determination program 37 determines that the position of the user terminal 100 is outside the living area K, an alarm notification program 38 notifies the guardian terminal 200 of an alarm by source or display. Thereby, the guardian can quickly and exactly grasp the fact that the watched person goes out of the living area K.

In addition, responding to this, when a display request for the present position of the user terminal 100 is issued from the guardian terminal 200, the map information creation program 34 creates map information S which displays a living area K and a present position H of the user terminal 100 as exemplarily illustrated in FIG. 17, and transmits the map information S to the guardian terminal 200 via the communication unit 16.

FIG. 17 is a conceptual view illustrating an example of map information displaying a positional relationship between a living area and a present position of the user terminal.

Note that, regardless of the determination result by the determination program 37, the map information creation program 34 can create, in response to a request from the guardian terminal 200, map information S indicating a position H of the user terminal 100 at a freely selected time and time zone at the present and in the past, and can transmit the position H to the guardian terminal 200 via the communication unit 16. Thereby, the guardian terminal 200 can confirm on the map, not only the present position of the user terminal 100, but also a movement history (plot P21→ P22→ . . . →P30) in a certain period (e.g. a certain day) of the user terminal 100. FIG. 18 illustrates an example of this.

FIG. 18 is a schematic view illustrating an example of map information on which a movement history of the user terminal is displayed.

By displaying map information S as exemplarily illustrated in FIG. 18, the guardian can confirm, from the display screen of the guardian terminal 200, a movement history (plot P21→P22→ . . . →P30) in a certain period (e.g. a certain day) of the user terminal 100.

In this manner, the monitoring system 10 includes the function of setting the living area K of the watched person, and notifying the guardian that the position of the user terminal 100 is outside the living area K.

The monitoring system 10 further includes, as optional functions, the battery residual capacity option x, and the forced sleep option y.

The battery residual capacity option x is provided by a battery residual capacity comprehension program 39.

The battery residual capacity comprehension program 39 refers to the upload information DB 24, and acquires the battery residual capacity information g. Then, based on the battery residual capacity information g, the battery residual capacity comprehension program 39 determines whether the battery residual capacity of the user terminal 100 is lower than a preset predetermined amount (e.g. a residual capacity of 20%).

In the field of the battery residual capacity option x of the setting screen M illustrated in FIG. 13, in the case where a notification x1 is set to be issued when the battery residual capacity has become small, if the battery residual capacity comprehension program 39 determines that the battery residual capacity is lower than the predetermined amount, the alarm notification program 38 refers to the user registration DB 22, recognizes the guardian address b of the Corresponding identification number a, and notifies the guardian terminal 200 of such a message as "Battery residual amount has become small" or "Charge is necessary".

By the message transmitted to the guardian terminal 200, the guardian can understand that the battery residual capacity of the user terminal 100 is small. Responding to this, the guardian can charge the battery 160 of the user terminal 100 when the battery 160 of the user terminal 100 can be charged on the spot. In addition, if the battery 160 cannot be charged on the spot, the setting program 36 may be activated from the guardian terminal 200, and an instruction may be input from the setting screen M to increase the interval i (e.g. from 1.5 minutes to 3 minutes), thereby to suppress the consumption amount of the battery 160 and to increase the operation time of the user terminal 100. Alternatively, a time zone y2 for forcibly sleeping the user terminal 100 can be set from the field of the forced sleep option y. Thereby, in order to suppress the consumption amount of the battery 160 of the user terminal 100, for example, a period in which the watched person is in school can be set the time zone y2 for forcibly sleeping the user terminal 100.

On the other hand, when the battery 160 is fully charged, the residual capacity information of the battery 160 is reflected in the battery residual capacity information g of the upload information DB 24 at the time of upload of information from the user terminal 100. Thus, the fact that the battery residual capacity has become full is recognized by the battery residual capacity comprehension program 39. Note that in the field of the battery residual capacity option x on the setting screen M, if a notification x2 is set to be issued when charge is completed for the battery 160, a message "Charge of the battery is completed in the user terminal 100" is notified to the guardian terminal 200 by the alarm notification program 38.

Next, a description will be given of an operation example of the monitoring system to which the monitoring method according to the embodiment of the invention with the above-described configuration is applied.

In order to start the use of the user terminal 100, it is first necessary to execute user registration by transmitting the identification number a of the user terminal 100 to the monitoring system 10. The user registration is executed by transmitting the identification number a of the user terminal 100 to the monitoring system 10 from the guardian terminal 200 that is, for example, a smartphone or a PC, via the communication network 70 such as the Internet.

The transmitted identification number a is received by the communication unit 16, and the mail address of the guardian terminal 200 is recognized as the guardian address b by the communication unit 16. The identification number a received by the communication unit 16 and the recognized guardian address b are written in the user registration DB 22 by the registration management program 31. Thereby, the user registration process is completed.

Upon the completion of the user registration process, the user terminal 100 is enabled to upload to the monitoring system 10 the information such as the identification number, GPS information, MAC address of the WiFi router, the received signal strength indicator information of the radio wave from the WiFi router, the received signal strength indicator information of the radio wave from the base station 60, and the battery residual capacity information, at the set intervals i of, for example, 1.5 minutes. Note that the interval i can be set by inputting a desired value from the guardian terminal 200 to the setting screen M which is displayed by the setting program 36.

The information uploaded from the user terminal 100 is received by the communication unit 16, and the corresponding information is written in each data item in the upload information DB 24 by the information accumulation program 32.

Note that when the uploaded information includes the MAC address of the WiFi router, the received signal strength indicator information of the radio wave from the WiFi router, and the received signal strength indicator information of the radio wave from the base station 60, these information pieces are output from the communication unit 16 to the positioning server 40 via the communication network 70 by the information accumulation program 32.

When the MAC address of the WiFi router and the received signal strength indicator information of the radio wave from the WiFi router are transmitted from the communication unit 16 to the positioning server 40, the positioning server 40 determines the position of the user terminal 100, based on these information pieces, and returns the corresponding position information (e.g. latitude/longitude information) as the WiFi information a to the communication unit 16 via the communication network 70.

In addition, when the received signal strength indicator information of the radio wave from the base station 60 is transmitted from the communication unit 16 to the positioning server 40, the positioning server 40 determines the position of the user terminal 100, based on this information, and returns the corresponding position information (e.g. latitude/longitude information) as the base station position information f to the communication unit 16 via the communication network 70.

The WiFi position information e and/or base station position information f, which is returned from the positioning server 40, is correlated with the corresponding time stamp c and accumulated in the upload information DB 24 by the information accumulation program 32.

In this manner, each time the information is uploaded from the user terminal 100, at least one of the position information pieces d, e and f of the user terminal 100 is correlated with the time stamp c, and accumulated in the upload information DB 24.

Based on the position information accumulated in the upload information DB 24 in this manner, the living area determination program 33 determines the living area K, and the determination program 37 determines the positional relationship between the user terminal 100 and the living area K, based on the determined living area K.

Figure 19:
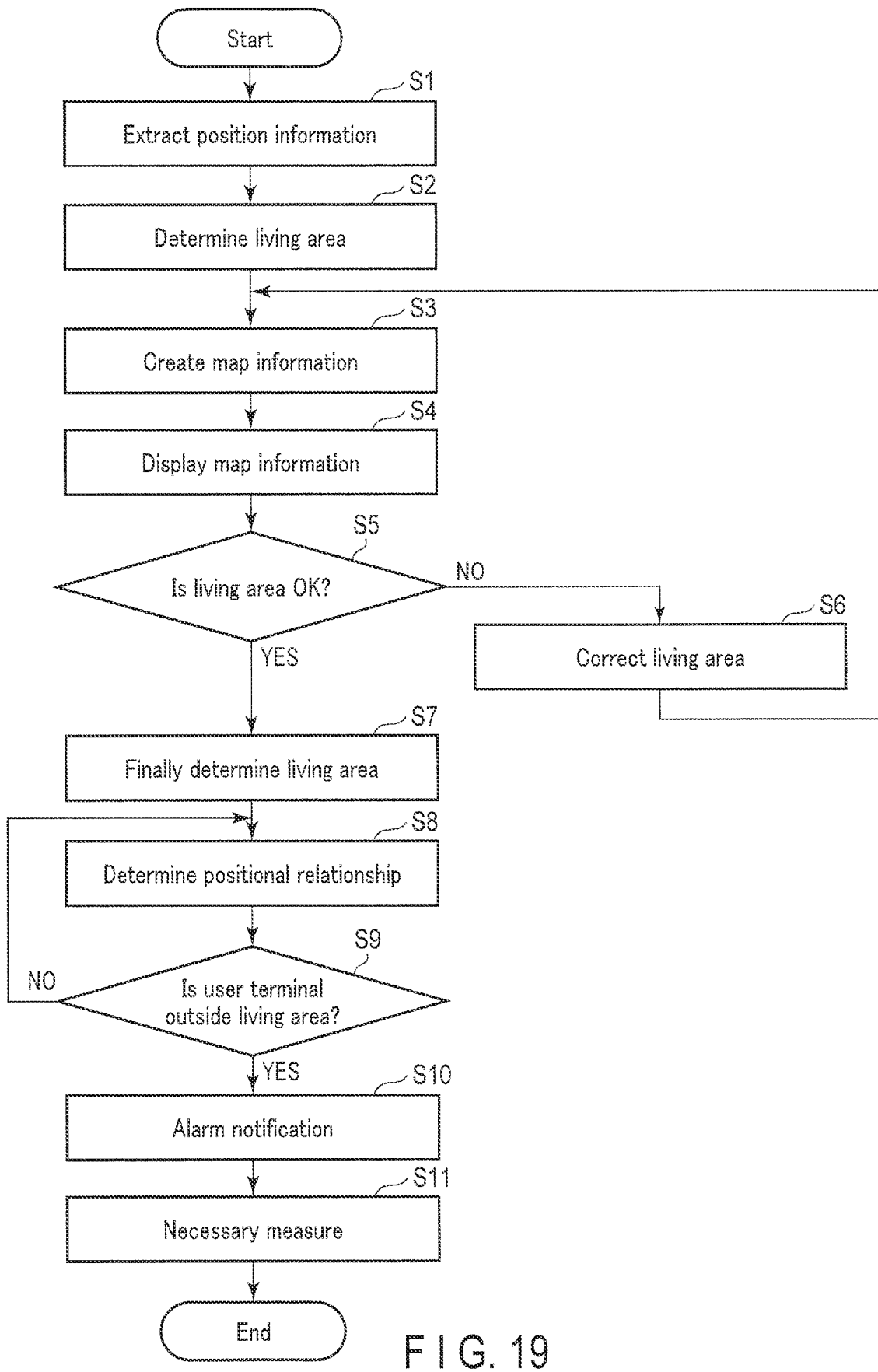
FIG. 19 is a flowchart illustrating a flow of a process relating to the determination of a living area and the determination of a positional relationship between the user terminal and the living area.

FIG. 19 is a flowchart illustrating a flow of a process relating to the determination of a living area and the determination of a positional relationship between the user terminal and the living area.

To start with, from the upload information DB 24, the position information d, e, f accumulated in the set predetermined period t, such as the past 30 days, is extracted, based on the time stamp c, from among the stored position information d, e, f correlated with the identification number a of the user terminal 100 (S1).

Then, the living area is determined by setting as a target the position information extracted in step S1 (S2). Note that, at this time, in the case where a plurality of kinds of position information (e.g. at least two of the position information d, the position information e and the position information f) are correlated with the time stamp c which is identical or can be considered to be identical, any one of these position information pieces, or one position information determined by proper weighting from the position information pieces, is set as the target.

The concrete determination method of the living area is not limited. For example, as described with reference to FIG. 6 and FIG. 7, the living area K is determined by connecting sections to which the position information accumulated in the predetermined period belongs a predetermined number of times or more (e.g. two times), among the sections on the map.

Alternatively, as described with reference to FIG. 8, the minimum projection-shaped area including all plots P21 to P30 displayed on the map is determined as the living area K.

Alternatively, as described with reference to FIG. 9, the minimum circular area including all plots P21 to P30 displayed on the map is determined as the living area K.

Alternatively, as described with reference to FIG. 10, the minimum rectangular area including all plots P21 to P30 displayed on the map is determined as the living area K.

Alternatively, as described with reference to FIG. 11, representative plots P11 to P15, which are located on the outermost part of the living area K, are selected. With only the selected plots P11 to P15 being set as the target, the neighboring plots are connected by straight lines or connected along the path of a road or a railway, and thereby an area including all plots is determined as the living area K.

These determination methods of the living area K are merely examples, and it is possible to modify a part of the above-described methods, or to properly combine the determination methods, or to follow some other algorithm.

In addition, the monitoring system 10 can determine a plurality of living areas for respective predetermined conditions, such as a living area for the weekdays u1, a living area for the weekends/holidays u2, a living area for a specific day of the week u3, and a living area in the specific time zone u4.

In this manner, if the living area K is determined the position information defining the living area K is written as the living area position information h of the corresponding identification number a in the user registration DB 22.

Thereafter, by the map information creation program 34, the living area position information h registered for the user in accordance with the corresponding identification number a is acquired from the user registration DB 22, and, based on the acquired living area position information h, the map information S, in which the living area K is specified on the map, is created, and the map information S is transmitted to the guardian terminal 200 via the communication unit 16 in accordance with the request from the guardian terminal 200 (S3).

The map information 8, which is transmitted to the guardian terminal 200, is displayed on the display screen of the guardian terminal 200 (S4). Thereby, the guardian can visually grasp the living area K of the watched person.

In addition, the guardian can also change the living Area K by viewing the map information S. If the guardian does not change the living area K (S5: Yes), the living area K is finally determined (S7). On the other hand, if the guardian wishes to change the living area K (S5: No), the guardian can change the living area K by inputting the predetermined period t, predetermined condition u and predetermined standard v from the setting screen M as illustrated in FIG. 13, or by tracing by the finger the living area K displayed on the display screen of the guardian terminal 200 as illustrated in FIG. 15 (S6).

Thereafter, the living area position information h of the user registration DB 22 is updated in accordance with the changed living area K, and the process returns to step S3.

If the living area K is finally determined (S7) by the repetition of the process of step S3 to step S6, the determination program 37 compares the position information of the user terminal 100 and the living area position information h, each time new information (time stamp c, identification information a, GPS position information d, WiFi position information e, base station position information f, battery residual capacity information g, and the like) is written in the upload information DB 24, thereby determining whether the position of the user terminal 100 is inside the living area K or outside the living area K (S8).

In accordance with the result of this determination, the map information creation program 34 creates the map information S in which the living area K and the present position H of the user terminal 100 are displayed, as exemplarily illustrated in FIG. 17, and transmits the map information S to the guardian terminal 200 via the communication unit 16. Thereby, the guardian can grasp the present position of the watched person.

Further, if the result of the determination indicates that the position of the user terminal 100 is outside the living area K (S9: Yes), the alarm notification program 38 notifies the guardian terminal 200 of an alarm by sound or display (S10). Thereby, the guardian can quickly and exactly understand the fact that the watched person goes out of the living area K, and can take a necessary measure (S11).

On the other hand, when it is determined that the position of the user terminal 100 is inside the living area K (S9: No), the process returns to step S8, and the subsequent process is continued.

As described above, according to the monitoring system 10 to which the monitoring method according to the embodiment of the present invention is applied, a proper living area K for the watched person can be determined by the above-described functions. In addition, the monitoring system 10 can provide functions for the guardian to freely set the predetermined period t, predetermined condition u and predetermined standard v for determining the living area K. Furthermore, when the position of the user terminal 100 moves out of the living area K, this is detected and notified to the guardian by an alarm or the like. Thus, the guardian can exactly understand, substantially in real time, the movement of the watched person to the outside of the usual area of activity of the watched person.

The present invention is not limited to the above-described embodiments. At the stage of practicing the invention, various modifications may be made without departing from the spirit of the invention. The embodiments may properly be combined and implemented as much as possible, and in such cases advantageous effects as combined can be obtained. Further, the embodiments include various inventions at various stages, and various inventions may be derived by properly combining structural elements disclosed in the embodiments.

The invention claimed is:

1. A monitoring system comprising:
   a memory configured to store computer-executable instructions; and
   a processor in communication with the memory and configured to execute the computer-executable instructions to at least implement:
   an information accumulation unit configured to accumulate position information of a first terminal carried by a watched person, the position information being determined based on information uploaded from the first terminal, wherein the information comprises a weighted combination of geolocation positioning information, wireless network information, and base station information;
   a living area determination unit configured to determine, without user input, a living area of the watched person based on position information accumulated in a predetermined period among pieces of the accumulated position information, wherein the predetermined period is set by a second terminal, and wherein the second terminal is separate from the first terminal;
   a determination unit configured to determine a positional relationship between a position of the first terminal, which is determined based on the position information of the first terminal, and the living area; and
   a notification unit configured to notify the second terminal, which is designated in advance, of a determination result by the determination unit.

2. The monitoring system of claim 1, wherein the living area determination unit is configured to determine the living area, based on, among a plurality of sections into which a map is divided, a section to which the position information accumulated in the predetermined period belongs a predetermined number of times or more.

3. The monitoring system of claim 1, wherein the living area determination unit is configured to determine, as the living area, an area including positions corresponding to the position information accumulated in the predetermined period.

4. The monitoring system of claim 3, wherein a shape of the area is a projection shape, a circular shape or a rectangular shape.

5. The monitoring system of claim 2, wherein the living area determination unit is configured to enlarge or reduce the determined living area, based on a predetermined standard.

6. The monitoring system of claim 2, wherein the predetermined period is past 30 days, and the predetermined number of times is two.

7. The monitoring system of claim 1, wherein, when determining the living area, the living area determination unit determines the living area, based on position information accumulated under a predetermined condition among pieces of the position information accumulated in the predetermined period.

8. The monitoring system of claim 7, wherein the position information accumulated under the predetermined condition is any one of position information accumulated in a weekday, position information accumulated in a weekend/holiday, and position information accumulated in a specific day of a week.

9. The monitoring system of claim 7, wherein the position information accumulated under the predetermined condition is position information accumulated in a specific time zone.

10. The monitoring system of claim 1, wherein the processor is further configured to execute the computer-executable instructions to at least implement a map information creation unit configured to create map information in which the living area is specified on a map; and wherein the monitoring system further comprises a transmitter configured to transmit the created map information to the second terminal.

11. The monitoring system of claim 1, wherein the processor is further configured to execute the computer-executable instructions to at least implement a living area correction unit configured to correct the determined living area in accordance with an instruction from the second terminal.

12. The monitoring system of claim 1, wherein when the determination unit determines that the position of the first terminal is out of the living area, the notification unit is configured to notify a result of the determination.

13. A monitoring system comprising:
   a receiver configured to receive information which defines a living area of a watched person;
   a memory configured to store computer-executable instructions; and
   a processor in communication with the memory and configured to execute the computer-executable instructions to at least implement:
   a living area determination unit configured to determine the living area of the watched person based on the information received by the receiver;

an information accumulation unit configured to accumulate position information of a first terminal carried by the watched person, the position information being determined based on information uploaded from the first terminal, wherein the information comprises a weighted combination of geolocation positioning information, wireless network information, and base station information;

a determination unit configured to determine a positional relationship between a position of the first terminal, which is determined based on the position information of the first terminal, and the living area; and a notification unit configured to notify a second terminal, which is designated in advance, of a determination result by the determination unit.

14. A monitoring method executed by a processor, the monitoring method comprising:

of accumulating, by the processor, position information of a first terminal carried by a watched person in a storage device, the position information being determined based on information uploaded from the first terminal, wherein the information comprises a weighted combination of geolocation positioning information, wireless network information, and base station information;

determining, by the processor and without user input, a living area of the watched person, based on position information accumulated in a predetermined period among pieces of the position information accumulated in the storage device, wherein the predetermined period is set by a second terminal, and wherein the second terminal is separate from the first terminal;

determining, by the processor, a positional relationship between a position of the first terminal, which is determined based on the position information of the first terminal, and the living area; and notifying, by the processor, the second terminal, which is designated in advance, of a result of the determining of the positional relationship.

15. A non-transitory computer-readable medium comprising computer-executable instructions, which when executed by a processor of a monitoring system, causes the monitoring system to:

accumulate position information of a first terminal carried by a watched person in a storage device, the position information being determined based on information uploaded from the first terminal, wherein the information comprises a weighted combination of geolocation positioning information, wireless network information, and base station information;

determine, without user input, a living area of the watched person based on position information accumulated in a predetermined period among pieces of the position information accumulated in the storage device, wherein the predetermined period is set by a second terminal, and wherein the second terminal is separate from the first terminal;

determine a positional relationship between a position of the first terminal, which is determined based on the position information of the first terminal, and the living area; and notify the second terminal, which is designated in advance, of a result of the determining of the positional relationship.

* * * * *